US009299120B2

(12) United States Patent
Zou et al.

(10) Patent No.: US 9,299,120 B2
(45) Date of Patent: Mar. 29, 2016

(54) MODIFYING A CODED BITSTREAM

(75) Inventors: Dekun Zou, Plainsboro, NJ (US); Jeffrey Adam Bloom, West Windsor, NJ (US); Peng Yin, West Windsor, NJ (US); Oscar Divorra Escoda, Princeton, NJ (US)

(73) Assignee: Thomson Licensing LLC, Boulogne-Billancourt (FR)

( * ) Notice: Subject to any disclaimer, the term of this patent is extended or adjusted under 35 U.S.C. 154(b) by 76 days.

(21) Appl. No.: 12/450,343

(22) PCT Filed: Nov. 2, 2007

(86) PCT No.: PCT/US2007/023173
§ 371 (c)(1),
(2), (4) Date: Sep. 22, 2009

(87) PCT Pub. No.: WO2008/118146
PCT Pub. Date: Oct. 2, 2008

(65) Prior Publication Data
US 2010/0169349 A1     Jul. 1, 2010

Related U.S. Application Data

(60) Provisional application No. 60/919,702, filed on Mar. 23, 2007, provisional application No. 60/934,634, filed on Jun. 14, 2007.

(51) Int. Cl.
*G06F 17/30*      (2006.01)
*G06T 1/00*       (2006.01)
(Continued)

(52) U.S. Cl.
CPC .............. *G06T 1/0035* (2013.01); *H04N 19/13* (2014.11); *H04N 19/467* (2014.11); *H04N 19/48* (2014.11); *H04N 19/70* (2014.11); *G06T 2201/0053* (2013.01)

(58) Field of Classification Search
CPC .................... G06F 17/30637; G06F 17/30675; G06F 17/30699
USPC ............................. 382/100; 707/100; 713/176
See application file for complete search history.

(56) References Cited

U.S. PATENT DOCUMENTS

| 4,939,515 A | 7/1990 | Adelson |
| 5,530,751 A | 6/1996 | Morris |

(Continued)

FOREIGN PATENT DOCUMENTS

| CA | 2692456 | 1/2009 |
| CN | 1473438 | 2/2004 |

(Continued)

OTHER PUBLICATIONS

Sakazawa et al., H.264 Native Video Watermarking Method, Circuits and System, ISCAS 2006 Proceedings, 2006 IEEE International Symposium (May 21-24, 2006), pp. 1439-1442.*

(Continued)

*Primary Examiner* — Mohammad S Rostami
*Assistant Examiner* — Ahmed Abraham
(74) *Attorney, Agent, or Firm* — Vincent E. Duffy; Brian J. Dorini; Ivonete Markman

(57) ABSTRACT

Implementations may relate to various aspects of modifying, or using, a coded bitstream, or to recovering watermarking information from data. In one implementation, a coded bitstream is modified to allow for the application of a watermark to the coded bitstream without changing the coding of any other syntax elements in the bitstream. This is performed by identifying conditions necessary to change a coded syntax element without disrupting the interpretation of subsequent coded elements. The coded syntax element is replaced with another coded value if the modified value generates the same decoding variables as the original value would have generated. Particular implementations focus on syntax elements coded using entropy coding, including, for example, Context-based Adaptive Binary Arithmetic Coding (CABAC). Regardless of the type of coding or watermarking, various implementations may provide for recovering watermarking information. Particular implementations recover watermarking information using detection data and feature information.

58 Claims, 10 Drawing Sheets

(51) Int. Cl.
*H04N 19/70* (2014.01)
*H04N 19/13* (2014.01)
*H04N 19/48* (2014.01)
*H04N 19/467* (2014.01)

(56) References Cited

U.S. PATENT DOCUMENTS

| | | | |
|---|---|---|---|
| 5,530,759 A | 6/1996 | Braudaway | |
| 5,574,567 A | 11/1996 | Cookson et al. | |
| 5,636,292 A | 6/1997 | Rhoads | |
| 5,646,997 A | 7/1997 | Barton | |
| 5,664,018 A | 9/1997 | Leighton | |
| 5,687,191 A | 11/1997 | Lee et al. | |
| 5,687,236 A | 11/1997 | Moskowitz et al. | |
| 5,710,834 A | 1/1998 | Rhoads | |
| 5,721,788 A | 2/1998 | Powell et al. | |
| 5,734,752 A | 3/1998 | Knox | |
| 5,748,783 A | 5/1998 | Rhoads | |
| 5,809,139 A | 9/1998 | Girod et al. | |
| 5,819,289 A | 10/1998 | Sanford et al. | |
| 5,960,081 A | 9/1999 | Vynne et al. | |
| 6,154,571 A | 11/2000 | Cox et al. | |
| 6,208,745 B1 | 3/2001 | Florencio et al. | |
| 6,282,300 B1 | 8/2001 | Bloom et al. | |
| 6,332,194 B1 | 12/2001 | Bloom et al. | |
| 6,411,725 B1 | 6/2002 | Rhoads | |
| 6,621,933 B2 | 9/2003 | Chung et al. | |
| 6,687,384 B1 | 2/2004 | Isnardi | |
| 6,717,535 B2 | 4/2004 | Furuta | |
| 6,785,332 B1 | 8/2004 | Kutter et al. | |
| 6,834,345 B2 | 12/2004 | Bloom et al. | |
| 6,909,784 B1 | 6/2005 | Sugahara | |
| 6,978,370 B1 | 12/2005 | Kocher | |
| 7,113,615 B2* | 9/2006 | Rhoads et al. | 382/100 |
| 7,277,587 B2* | 10/2007 | Sun | 382/236 |
| 7,437,721 B2 | 10/2008 | Watson et al. | |
| 7,636,440 B2 | 12/2009 | Weirauch | |
| 7,769,088 B2 | 8/2010 | Prakasam et al. | |
| 7,853,124 B2 | 12/2010 | Ramaswamy et al. | |
| 7,974,714 B2* | 7/2011 | Hoffberg | G06K 9/00369 360/75 |
| 8,046,580 B2 | 10/2011 | Taylor | |
| 8,064,518 B2 | 11/2011 | Maeda | |
| 8,094,877 B2 | 1/2012 | Sharma et al. | |
| 8,127,137 B2 | 2/2012 | Levy | |
| 8,160,157 B2 | 4/2012 | Lamy-Bergot et al. | |
| 8,161,463 B2 | 4/2012 | Johnson et al. | |
| 8,358,703 B2 | 1/2013 | Zou et al. | |
| 2001/0017885 A1 | 8/2001 | Asai et al. | |
| 2001/0026616 A1* | 10/2001 | Tanaka | G06T 1/0028 380/202 |
| 2002/0015509 A1* | 2/2002 | Nakamura et al. | 382/100 |
| 2002/0129253 A1 | 9/2002 | Langelaar | |
| 2003/0016756 A1 | 1/2003 | Steenhof et al. | |
| 2003/0033529 A1 | 2/2003 | Ratnakar et al. | |
| 2003/0072467 A1 | 4/2003 | Brundage et al. | |
| 2003/0185417 A1* | 10/2003 | Alattar et al. | 382/100 |
| 2004/0001611 A1 | 1/2004 | Celik et al. | |
| 2004/0120404 A1 | 6/2004 | Sugahara et al. | |
| 2004/0151313 A1 | 8/2004 | Weirauch | |
| 2005/0021539 A1 | 1/2005 | Short et al. | |
| 2005/0240767 A1 | 10/2005 | Lemma et al. | |
| 2006/0020809 A1* | 1/2006 | Hayashi | 713/176 |
| 2006/0095253 A1 | 5/2006 | Schuller et al. | |
| 2006/0227873 A1* | 10/2006 | Toebes | G06T 1/0035 375/240.15 |
| 2006/0257000 A1 | 11/2006 | Boyce et al. | |
| 2007/0053438 A1* | 3/2007 | Boyce et al. | 375/240.24 |
| 2007/0080832 A1 | 4/2007 | Yang et al. | |
| 2008/0025561 A1* | 1/2008 | Rhoads | G01C 11/00 382/100 |
| 2008/0097786 A1* | 4/2008 | Sachdeva | G06F 19/322 705/2 |
| 2008/0137848 A1* | 6/2008 | Kocher | G06F 21/10 380/201 |
| 2008/0212824 A1* | 9/2008 | Braudaway et al. | 382/100 |
| 2008/0260028 A1 | 10/2008 | Lamy-Bergot | |
| 2009/0080689 A1 | 3/2009 | Zhao et al. | |
| 2009/0208131 A1 | 8/2009 | Nguyen et al. | |
| 2009/0219987 A1* | 9/2009 | Base et al. | 375/240.01 |
| 2009/0290750 A1* | 11/2009 | Tapson | G06T 1/005 382/100 |
| 2010/0020876 A1* | 1/2010 | Jeon et al. | 375/240.16 |
| 2010/0027684 A1 | 2/2010 | Zou et al. | |
| 2010/0150394 A1 | 6/2010 | Bloom et al. | |
| 2010/0169349 A1 | 7/2010 | Zou et al. | |

FOREIGN PATENT DOCUMENTS

| | | |
|---|---|---|
| CN | 1659855 | 8/2005 |
| EP | 0928110 A2 | 7/1999 |
| FR | 2894759 | 12/2005 |
| JP | 2003319166 | 11/2003 |
| JP | 200699780 | 4/2006 |
| KR | 20060027814 | 3/2006 |
| KR | 10-2011-0050456 | 2/2010 |
| WO | 96/21290 | 7/1996 |
| WO | WO2006041145 | 4/2006 |
| WO | 2006067172 A1 | 6/2006 |
| WO | WO 2007067168 | 6/2007 |
| WO | WO2007122216 | 11/2007 |
| WO | 2008118145 | 2/2008 |
| WO | 2008154041 | 12/2008 |
| WO | 2009/005494 A1 | 1/2009 |

OTHER PUBLICATIONS

Sakazawa et al., H.264 Native Video Watermarking Method, Circuits and System, ISCAS 2006 Proceedings, 2006 IEEE International Symposium (May 21-24, 2006; hereinafter Sakazawa).*

Ingemar J. Cox, et al., "Secure Spread Spectrum Watermarking for Multimedia", IEEE Transactions on Image Processing, Dec. 1997, pp. 1673-1687, vol. 6, No. 12.

Christopher Dautzenberg, "Watermarking Images", Department of Microelectronics and Electrical Engineering, Oct. 1994, pp. 1-47, Trinity College, Dublin.

E. Koch, et al., "Towards Robust and Hidden Image Copyright Labeling", Proc. of 1995 IEEE Workshop on Nonlinear Signal and Image Processing, Jun. 1995, pp. 1-4, Marmaras, Greece.

F. Goffin, et al., "A Low Cost Perceptive Digital Picture Watermarking Method", Laboratoire de Telecommunications et Teledetection, 14 pages, Batiment Stevin.

Dawen Xu, et al., "Watermarking in H.264/AVC compressed domain using Exp-Golomb code words mapping", Optical Engineering, Sep. 2011, pp. 097402-1-097402-11, vol. 50(9), Ningbo University of Technology, China.

Adrian Tudoroiu, et al., "Block Map Implementation of Difference Expansion Reversible Watermarking", Faculty of Electrical Engineering, 2 pages, Valahia University of Targoviste, Romania.

Jyotsna Singh, et al., "MPEG-2 Video Watermarking using Quantization Index Modulation", IEEE, Netaji Subhas Institute of Technology, 2010, 6 pages, New Delhi, India.

Dekun Zou, et al., "H.264 Stream Replacement Watermarking with Cabac Encoding", IEEE, 2010, pp. 117-121, Technicolor Corporate Research and Dialogic Media Labs.

Da-Wen Xu, et al., "Low Complexity Video Watermarking Algorithm by Exploiting CAVLC in H.264/AVC", IEEEE, 2010, pp. 411-415, China.

Xiang Wang, et al, "Efficient Generalized Integer Transform for Reversible Watermarking", IEEE Signal Processing Letters, Jun. 2010, 4 pages, vol. 17, No. 6.

Dekun Zou, et al., "H.264/AVC Substitution Watermarking: A CAVLC Example", Thomson Corporate Research, 2008, 12 pages, Princeton, New Jersey.

Office Action for U.S. Appl. No. 12/450,200 mailed Sep. 19, 2011.

Lian et al., "Secure Advanced Video Coding Based on Selective Encryption Algorithms", IEEE Trans. on Consumer Electronics, vol. 52, No. 2, May 2006, pp. 621-629.

Zou et al.:"H.264 Video Encryption Scheme Adaptive to DRM", IEEE 2006, pp. 1289-1297, XP0011153009.

(56) References Cited

OTHER PUBLICATIONS

Bender et al.:"Techniques for Data Hiding", IBM Systems Journal, vol. 35, Nos. 3&4, 1996, pp. 313-335, XP00635079.
Cox et al.:"Digital Watermarking and Steganography", Second Edition, Morgan Kaufmann Publishers, 2008.
ITU-T Telecommunication Standardization Sector of ITU.:"Advanced Video Coding for Generic Audiovisual Services", ITU-T Recommendation H.234, Mar. 2005, pp. i-324.
Kim et al.:"An Entropy Masking Model for Multimedia Content Watermarking", Proceedings of the 37th Hawaii International Conference on System Sciences—2004, IEEE 2004, pp. 1-6.
Liu et al.:"A MPEG-2 Video Watermarking Algorithm with Compensation in Bit Stream", DRMTICS 2005, LNCS 3919, pp. 123-134, 2006, XP002445774.
Marpe et al.:"Context-Based Adaptive Binary Arithmetic Coding in the H.264/AVC Video Compression Standard", IEEE Transactions on Circuits and Systems for Video Technology, vol. 13, No. 7, Jul. 2003, XP0011099255.
Mobasseri et al.:"Authentication of H.264 Streams by Direct Watermaking of CAVLC Blocks", Department of electrical and Computer Engineering, Villanova University, Villanova, PA, XP002471066, vol. 6505, 2007.
Nguyen et al.:"A Fast Watermarking System for H.264/AVC Video", Department of Electronic engineering, La Trobe University, Bundoora, VIC3086, Australia, pp. 81-84, XP0031070779.
Noorkami et al.:"Compressed-Domain Video Watermarking for H.264", Center for Signal and Image Processing, Georgia Institute of Technology, Atlanta, GA, USA, 2005, IEEE.
Noorkami et al.:"Towards Robust Compressed-Domain Video Watermarking for H.264" SPIE-IS&T/vol. 6072, 60721A.
Richardson.:"H.264 and MPEG-4 Video Compression", Video Coding for Next-generation Multimedia, Wiley, 2003.
Witten et al.:"Arithmetic Coding for Data Compression", Communications of the ACM, vol. 30, No. 6, Jun. 1987, pp. 520-540.
Zhou et al.:"A Fragile Watermark Error Detection Scheme for JVT", IEEE 2003, pp. II-956-II-958.
Search Report dated Mar. 4, 2008.
Hartung, et al., "Digital Watermarking of MPEG-2 Coded Video in the Bitstream Domain," IEEE, 1997, Telecommunication Institute, University of Erlangen-Nuremberg, Erlangen, Germany, pp. 2621-2624.
Zhang, et al., "Embedding Watermark in MPEG Video Sequence," 2001, IEEE, pp. 535-540.
Zou, et al., "H.264/AVC Stream Replacement Technique for Video Watermarking", Mar. 31, 2008, pp. 1749-1752, Thomson Corporate Research, Princeton, NJ.
Wiegand, et al., "Overview of the H.264/AVC Video Coding Standard," IEEE Transactions on Circuits and Systems for Video Technology, vol. 13, No. 7, Jul. 2003, pp. 560-576.
Wolfgang, et al., "Perceptual Watermarks for Digital Images and Video", Proceedings of the IEEE, vol. 7, No. 7, Jul. 1999, pp. 1108-1126.
Ozbek, et al., "A Survey on the H.264/AVC Standard, "International Computer Institute, Ege University, vol. 13, No. 3, 2005, pp. 287-302.
Seo, et al., "A Blind Watermarking Algorithm using CABAC for H.264/AVC Main Profile," Journal of the Korea Information & Communications Society, Article 07-32-2-10, vol. 32, No. 2, Mar. 15, 2006.
International Telecommunication Union, "Advanced Video Coding for Generic Audiovisual Services," ITU-T, H 264, Series H: Audiovisual and Multimedia Systems, Mar. 2005, pp. 1-325.
Zou, et al , "H.264 Video Encryption Scheme Adaptive to DRM", IEEE Transactions on Consumer Electronics, Nov. 2006, pp. 1289-1297, vol. 52, No. 4.
Dell Inc., "Blu-Ray Disc Next-Generation Optical Storage. Protecting Content on the BD-ROM", Oct. 2006, pp. 1-6.
"Real-time Labeling of MPEG-2 Compressed Video", Journal of Visual Communication and Image Representation, vol. 9, Issue 4, pp. 256-270, Dec. 1998.

* cited by examiner

MODIFYING A CODED BITSTREAM

CROSS-REFERENCE TO RELATED APPLICATIONS

This application claims the benefit, under 35 U.S.C. §365 of International Application PCT/US2007/023173, filed Nov. 2, 2007, which was published in accordance with PCT Article 21(2) on Oct. 2, 2008 in English and which claims the benefit of U.S. provisional patent application No. 60/919,702, filed Mar. 23, 2007 and U.S. provisional patent application No. 60/934,634, filed Jun. 14, 2007.

BACKGROUND

1. Technical Field

This disclosure provides implementations relating, for example, to coding.

2. Description of the Prior Art

Watermarking typically involves modifying a portion of data in such a way that the watermark can be detected at a later time. Various different types of data can be watermarked, including coded data. However, coding schemes are advancing and existing mechanisms for modifying coded data may not provide desired watermarking capabilities for such advancing coding schemes.

SUMMARY

According to a general aspect, a location in a digital representation of data, at which to check for watermark information, is determined. Data from the determined location is accessed and analyzed. The watermark information, if any, is identified based on the analyzed data.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations, or embodied as an apparatus storing instructions for performing a set of operations, or embodied in a signal. Other aspects and features will become apparent from the following detailed description considered in conjunction with the accompanying drawings and the claims.

DETAILED DESCRIPTION

Figure 1:
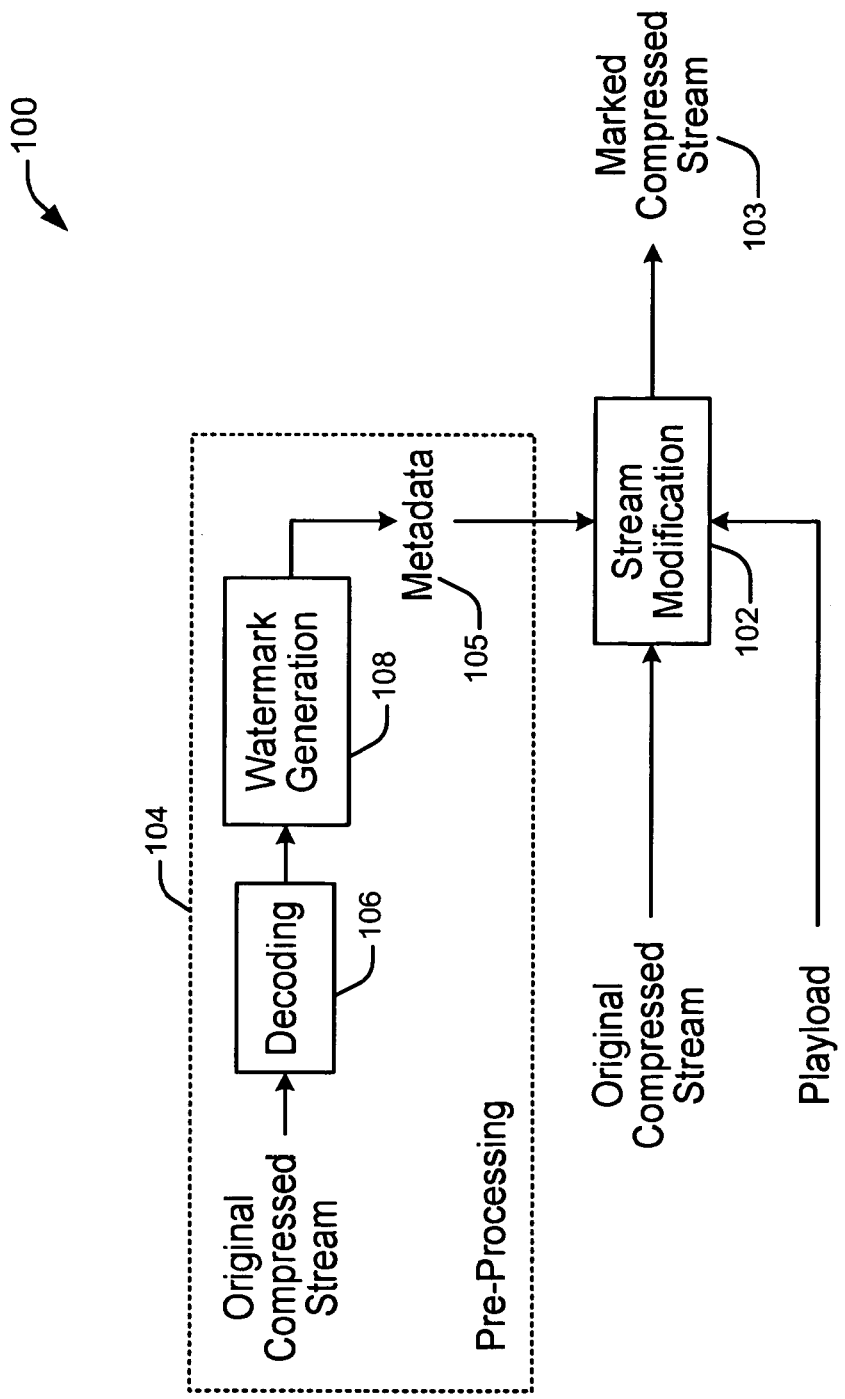
FIG. 1 is a block diagram of an implementation of entropy coded stream watermarking.

At least one implementation modifies an entropy encoded bitstream directly without requiring entropy decode and re-encode steps. Further, implementations are provided in which the entropy code is an arithmetic code and, more specifically, in which the arithmetic coding scheme known as Context-based Adaptive Binary Arithmetic Coding (CABAC) is used. CABAC can be characterized as a coding scheme with "memory" in that subsequent coded sequences depend on previous coded sequences. Thus, a given coded sequence is modified, in the implementation, in such a way that subsequent coded sequences can still be correctly decoded. Additionally, implementations are provided that apply a watermark to an entropy encoded bitstream directly without requiring entropy decode and re-encode steps. At least one watermarking implementation modifies CABAC encoded bitstream. CABAC is widely used in the H.264/AVC standard.

In many applications there is an increasing market need for watermarking of a compressed video stream. Early approaches decompressed the stream, applied the watermarking in the pixel domain, and then recompressed. An early advance was to use information from the original compressed stream to simplify the recompression. This was improved with techniques that partially decompress the stream by applying entropy decoding and parsing of the coded bitstream. After entropy decoding, the watermarking algorithms worked directly on syntax elements such as coefficients and motion vectors. After the stream was modified to represent the watermark data, the entropy coding would be applied. We propose implementations in this disclosure that apply the watermarking on an entropy encoded bitstream directly without the entropy decode and re-encode steps.

Watermarking a CABAC stream involves changing a coded syntax element in the CABAC stream. However, as mentioned above, it is desirable to apply a watermark by modifying a coded syntax element of a CABAC bitstream without changing the coding of any other syntax elements. This is difficult because the value of each element in a CABAC stream affects the interpretation of the values that follow. In general, changing a coded syntax element will cause all future coded elements to be misinterpreted or non-decodable by the decoder.

Some applications have an additional constraint that the changes made to an encoded bitstream cannot change the length of the bitstream. At the extreme, it is required that a coded element be replaced with an alternative value only if the bit length of the alternative value is the same as that of the original value.

Initially, we discuss the scenario in which a string of bits in a CABAC encoded H.264/AVC stream can be replaced with a different string of bits such that the modifications affect only a targeted syntax element and do not interfere with the correct interpretation of any other coded syntax elements. In such a scenario, it is not required that the replacement string of bits be the same length as the original string of bits. Not all of the syntax elements in an H.264/AVC bitstream are CABAC encoded and it may be possible to modify these non-CABAC elements. However, at least one implementation described herein concentrates specifically on those syntax elements that are encoded with CABAC.

Second, we describe and show an efficient approach that can be used when we do require that the replacement string of bits is the same length as the original string of bits.

Third, we, describe and show how to modify syntax elements in a CABAC encoded bitstream as described above in order to embed information into the bitstream. Further, this information can later be recovered by analyzing the modified bitstream or by decoding the bitstream to a sequence of pixel-domain images and analyzing these images.

Finally, we describe and show how bypass mode can be exploited to improve the efficiency of the watermark embedding process for the coded bitstream.

A brief discussion of CABAC, Bypass Mode, and Watermarking is provided to assist in the understanding of various implementations. These discussions are often specific. However, these discussions are not intended to be complete and, further, every detail in these discussions may not necessarily apply to all implementations described in this application. Additionally, these discussions include much material that is known to those of skill in the art. However, these discussions will invariably include material, or the organization of material, that is novel, even though such instances might not be pointed out specifically. These discussions are not intended to limit the breadth of the application. Rather, these discussions provide one or more specific contexts, of many possible contexts, to assist the reader in understanding the implementations.

CABAC Discussion

The final step in many video compression methods is the lossless entropy coding of the compressed data. In H.264/AVC, CABAC is commonly used for entropy coding. CABAC is an arithmetic coding scheme that achieves improved compression performance by maintaining individual contexts for each syntax element type and by adapting these contexts with each coded element. This represents a number of extensions of typical arithmetic coding schemes. First, CABAC is designed to arithmetically encode binary data. In other words, each symbol is either a 0 or a 1. Syntax element values that are not inherently binary are first binarized prior to arithmetic coding. This means that there is only the probability of a 0 and the probability of a 1. The specific method of binarization is intended to optimize the effectiveness of the subsequent arithmetic coding. Each binarized syntax element is called a bin string. A second extension is that the coding is adaptive. As each bit of bin string is processed, the decoding variables that control the coding are allowed to change. Finally, this adaptation is allowed to be context-based. Associated with each bit is a context made up of a number of variables. Some of the context variables are shared among a number of contexts and some are dedicated to a single context. Coding of one syntax element causes the associated context to adapt. H.264/AVC defines 460 separate contexts that are maintained during encoding and decoding.

The term "Decoding Variables" used above refers to two sets of variables. The first set is called "Context Variables" which contains two variables which represent the probability of a 0 or a 1 (represented by the identification of which of these symbols is least probable, LPS, and a probability state index, I, into a table of probabilities indicating the probability of this LPS appearing next in the bitstream). Each context is associated with a context index which maintains a set of context variables. The second set is called "State Variables" which is composed of two variables in order to define the internal CABAC range value (represented by the bottom of the range, L, and the width of the range, R). The L and R variables are shared among all syntax elements while separate LPS and I values are maintained for each context. The terms, "state variables", "state value(s)", and "state variable values" are interchangeably used herein.

After binarization, the appropriate decoding variables are retrieved and used to arithmetically encode the bin string. After each bit is encoded (or decoded), the corresponding context will be updated based on the encoded (or decoded) bit and the previous context values.

For a particular syntax element, the next symbol to be coded is expected to be the MPS (the most probable symbol is the binary symbol that is not the LPS). If this occurs, it will cause the index, I, to change to reflect a further decrease in the expectation or probability of the LPS appearing next. If the LPS appears, the index will change to reflect an increase in the probability of the LPS. The probability of the LPS cannot exceed 50% for this would mean that the symbol is no longer the least probable. In this case, the LPS will change to the other symbol and the index will again represent a probability less than 50%.

The L and R values are updated the same way as all arithmetic encoding processes. Depending on which symbol is encoded, the L will be the lower boundary of current interval and the R will be the width of the current interval.

In general, there are no two bin strings that result in the same changes to the state variables (specifically the L and R) and this would imply that it is not possible to modify an arithmetically-encoded bitstream without causing the decoder to misinterpret all subsequent coded elements. However, CABAC requires that L and R be represented with fixed length binary numbers. This is accomplished through a process known as renormalization. Specific details of the renormalization of the L and R can be found, for example, in the H.264 standard.

One result of this renormalization process is that it becomes possible for a number of different bin strings to induce the same changes to the L and R. At least one implementation exploits this fact to identify syntax element values that can be replaced with different values while maintaining the original L and R state variable values in the CABAC decoder.

Bypass Mode Discussion

In the special case of, syntax elements for which the two symbols have equal probability, the LPS and state index would be updated constantly without introducing any gain in terms of coding efficiency. The probability represented by the index would be essentially 50% meaning that the range, R, would experience the same predictable change from one bit to the next.

In order to speed up the encoding/decoding process without compromising coding efficiency, syntax elements for which the symbols are expected to have equal probability are identified and treated in a special way called bypass mode. Here, no context is used and the probability of both symbols is fixed to be 0.5. The result is that the range, R, will be half of the value after each decoded bin regardless of its value. The renormalization will double the R so the final fixed-length representation of R will remain unchanged in bypass mode decoding. Only the bottom of the range, L, adapts as new symbols are coded. At least one implementation exploits bypass mode in order to simplify the search for syntax element values that can be replaced with different values while maintaining the original state variable values in the CABAC decoder.

The H.264 standard specifies three syntax elements that must be coded with bypass mode CABAC. These are the sign of coefficients, the suffix of motion vector difference, and the suffix of coefficient data.

Watermarking Discussion

We now present a short discussion of the general field of watermarking and the more specific area within this field in which one or more described implementations apply. Those of ordinary skill in the art of watermarking will be familiar with much of the information presented here.

The phrase "digital watermarking", as used herein, typically refers to methods that modify a work of art (typically an image, motion image sequence, or audio clip) according to some payload data, such that the following conditions are satisfied:

1. The modified version of the work is perceptually indistinguishable to the original version of the work, and 2. The payload data can be recovered from the modified version of the work at a later time.

A subclass of digital watermarking methods, referred to as "robust digital watermarking", introduces a third condition:

3. The payload data can be recovered from a distorted version of the modified version of the work, where the distortion may have been introduced by common signal processing and signal handling to which the modified work may have subjected (for example, compression, noise reduction filtering, color enhancements, etc.) or the distortion may have been introduced intentionally by an adversary attempting to render the payload data unrecoverable.

There are many applications of robust digital watermarking including, but not limited to, the following:

1. Owner Identification: the watermark payload identifies the owner of a work.

2. Copy Control: the watermark payload indicates a copyright associated with a work. Devices for viewing, duplicating, recording, printing, distributing, or any other action can recover the payload data and restrict action to those allowed by the copyright.

3. Transaction Tracking: the watermark payload identifies the recipient to whom the copy of a work was legitimately distributed. This can be useful when the legitimate recipients do not receive the rights to further distribute the work. If an unauthorized work is discovered, the original content owner can recover the payload from the unauthorized copy and identify the recipient responsible for the unauthorized use.

Those of ordinary skill in the art will recognize that there are many other applications of robust digital watermarking.

Watermarking can be performed in the "baseband" or on compressed works. Baseband imagery or motion image sequences are, for example, pixel-domain representations. Baseband audio works are, for example, audio samples. Some applications require watermarking of a compressed work. In this case, the output is also a compressed work. The last step of compression is typically entropy coding and the first step of decompression is typically entropy decoding. The entropy encoding/decoding process is typically lossless. One approach for watermarking a compressed work is first to apply the entropy decoding, then apply the decompression to obtain a baseband representation. The baseband representation is watermarked and the resulting watermarked work is compressed and entropy coded. This approach can be time consuming and can result in degradation of perceptual quality due to the recompression.

To improve the perceptual quality and to reduce the computation required, information from the original compressed work, such as motion vectors, mode decisions, quality factors, and other information, can be saved during decompression and used during recompression. This means that the recompression need not perform any motion estimation (thus saving computation and/or time) and use of the original quantization factors and mode decisions can result in improved perceptual quality.

A class of watermarking algorithms called "compressed domain watermarking" has emerged. These methods can be described as performing a "partial decode" prior to watermarking rather than the "full decode" previously described. Here the compressed work is first entropy decoded to expose the syntax elements of the compressed work. These can include coefficients (block DCT or wavelet coefficients for example), motion vectors, picture types, prediction modes, and many other syntax elements. The watermarking algorithm then directly modifies some of those syntax elements. Finally, the modified syntax elements are entropy coded to obtain the modified compressed work.

At least one implementation described in this application falls into a new class of watermarking algorithms which could be called "entropy coded stream watermarking." These methods directly modify an entropy coded stream as illustrated in FIG. 1.

Referring to FIG. 1, the original compressed stream is directly modified by stream modification 102, according to the Payload, and the output is the resulting marked compressed stream 103. The payload can be, for example, the serial number of the player, the model of the player, or essentially any other information desired to be used for later identification. The stream modification process is informed as to the location of all changes to be made and the actual changes to be made by metadata which can be generated during a preprocessing stage 104. The metadata 105 is generated by decoding 106 the original compressed stream, and generating a watermark 108. The metadata identifies the locations within the stream where changes are to be made (that is, for watermark generation) and indicates how the stream should change in response to different payload symbols. FIG. 1 shows a special case in which the metadata is generated by an analysis of the decoded syntax elements of the compressed work. One challenging aspect of a watermarking method such as this is the generation of the metadata. The following explains how this can be done for one or more implementations.

The previous paragraph and FIG. 1 suggest that there may be a pre-processing stage 104. It is useful to point out the situation in which there are three important times. The first time is where/when the compressed bitstream is analyzed to generate some metadata. The second time is where/when some or all of the metadata generated at the first time is used, along with a specific sequence of symbols, known as the payload, to modify the bitstream. The third time is where/when some or all or none of the metadata generated at the first time is used to analyze a modified bitstream or a motion image sequence obtained by decompressing the modified bitstream or a distorted version of the motion image sequence obtained by decompressing the modified bitstream. The purpose of this analysis, in the third time, is to recover the payload.

In order to understand the context, consider the first time occurring prior to distribution of a work, the second time occurring during duplication where the payload used for each copy uniquely identifies that copy, and the third time occurring after an unauthorized copy of the work has been found at which time the payload is recovered to reveal which of the distributed copies was the source of the unauthorized copy. This example is just an illustration, and is not intended to suggest any limits to the application of these concepts. In addition, while there may be application-specific requirements, there is no technical requirement that the first time (the preprocessing) and the second time (the embedding) be different.

As additional examples, we refer back to FIG. 1. The pre-processing stage may be performed during the authoring of a movie for delivery, for example. In one scenario, a process is performed to identify locations of coded elements for which acceptable replacements have been determined. The results of that process (for example, the locations of such coded elements and the acceptable replacement values) are stored in metadata that is included with the coded movie.

The stream modification may be performed during playback of the movie, in which, for example, the serial number of the player (for example, a software player, a set top box player, or a DVD player) is used as the payload. The payload is used, for example, to determine whether to replace the identified coded elements. For example, if a single acceptable alternative is provided in the metadata, then a "0" in the payload sequence may indicate "no replacement" for the associated coded sequence, and a "1" may indicate "replacement". As another example, all identified locations may be replaced, and the payload may indicate which of two provided replacement values (for each coded sequence that is identified by location) is to be used. For example, a "0" may indicate to use the first replacement, and a "1" may indicate to use the second replacement.

The recovery of the payload may be performed at a location that is unrelated to the locations at which the stream modification occurred. The key is to have access to a document containing data based on modified stream. For example, a modified stream may be copied electronically and put on a recordable DVD, or a modified stream may be presented and then re-recorded and encoded, and then put on a recordable DVD. If this recordable DVD is acquired, then this recordable DVD can be analyzed to recover the payload.

CABAC Based Data Embedding in AVC Coded Bitstreams

One way to watermark a compressed stream is to change the values of one or more syntax elements in accordance with the following requirements/conditions:

R1. The modified compressed stream is still a valid stream (remains compliant with the specific compression standard).

R2. The motion image sequence obtained by decompressing the modified compressed stream is perceptually indistinguishable from the motion image sequence obtained by decompressing the original compressed stream.

R3. The modification to the stream results in a measurable change in the motion image sequence obtained by decompressing the modified compressed stream.

Requirement R1 is particularly challenging when the compression technique uses an arithmetic code entropy coding technique. This is the case for H.264/AVC with CABAC.

We first consider requirement R1 and discuss how a string of bits in a CABAC encoded H.264/AVC stream can be replaced with a different string of bits such that modified compressed stream is still a valid stream. This requires that the modifications affect only a targeted syntax element and do not interfere with the correct interpretation of any other coded syntax elements. In this implementation, it is not required that the replacement string of bits be the same length as the original string of bits (this constraint is discussed later). For purposes of explanation, the following description addresses modifying a single syntax element, referred to as the "target element." However, those of ordinary skill in the art will recognize that the same concept can be applied to a set of target elements that includes more than one target element.

The target element has an "original value" which is binarized to an "original bin string". The original bin string is CABAC coded, along with other syntax elements to yield the "original Coded Block" of bits. In the CABAC coding process, the original bin string modifies the state variables and the contexts that are associated with the syntax from their original values to their modified values.

Figures 2A, 2B:
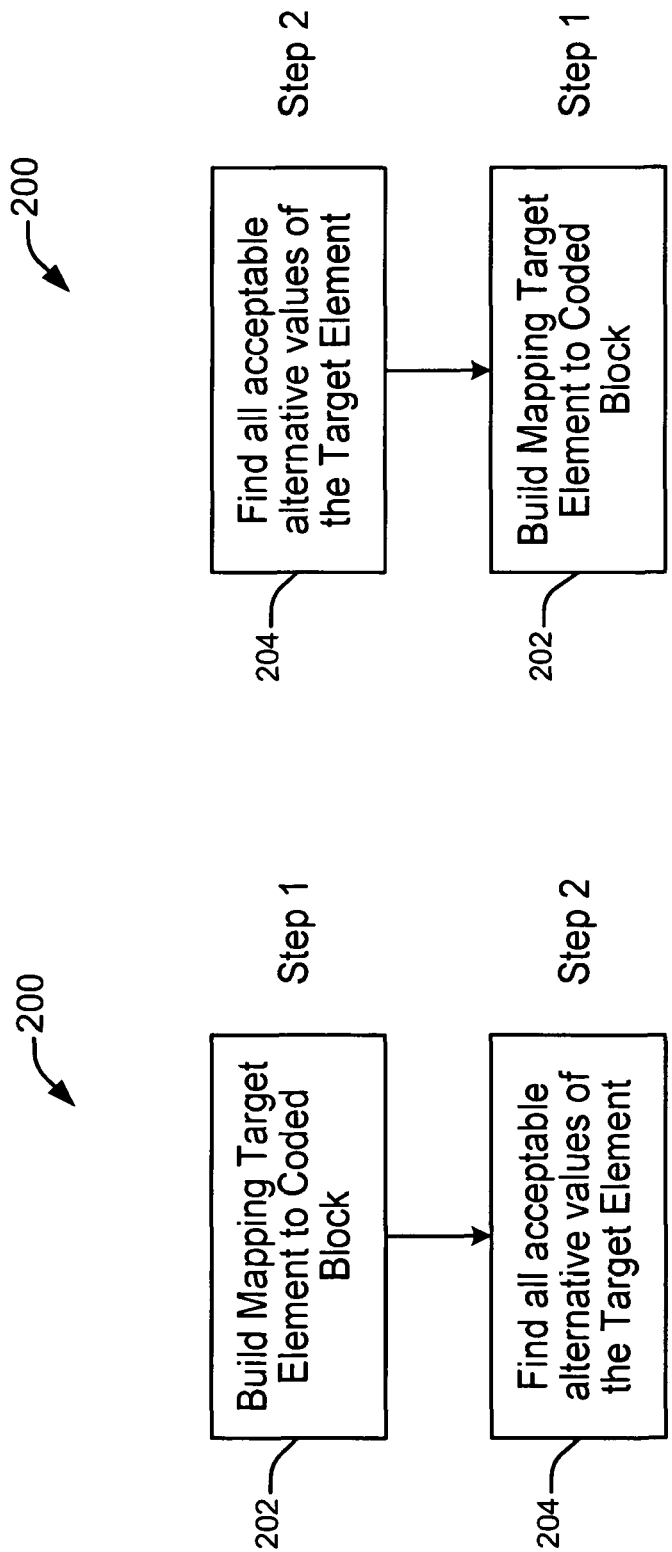
FIG. 2a is a block diagram showing an ordering of operations used in modifying an encoded bitstream.
FIG. 2b is a block diagram showing another ordering of operations used in modifying an encoded bitstream.

In various described implementations, there are two steps to modifying a CABAC encoded bitstream to comply with requirement R1, but the steps can be performed in either order. In discussing these steps, reference is made to "Step 1" and "Step 2", but these step numbers are not intended to imply or require any particular or specific order of performance of the same. FIGS. 2a and 2b are block diagrams showing the steps for satisfying the requirement R1.

Given a CABAC encoded H.264/AVC bitstream, Step 1 is to build a mapping (202) from the target element to the original coded block. In one practical implementation, this is done by decoding the bitstream and keeping track of which bitstream bits produce which syntax elements (and corresponding state variable values). In a second practical implementation, a CABAC decoder is applied to the compressed bitstream to expose the syntax elements. These syntax elements are then processed by an instrumented CABAC encoder to restore the original compressed bitstream. The restored bitstream is not of interest here, but rather it is the instrumentation of the CABAC encoder that is useful. The instrumented CABAC encoder can be used to track the correspondence between syntax elements and their final positions in the compressed bitstream.

Step 2 is to search for one or more acceptable alternative values for the target element (204). One way to search for acceptable alternative values is to examine all possible alternative values and determine which, if any, are acceptable. Each possible alternative syntax value will be binarized to an alternative bin string. The alternative bin string is CABAC coded, along with other syntax elements to yield the alternative Coded Block of bits. In the CABAC coding process, the alternative bin string modifies the state variables and the affected contexts from their original values to their alternative values. If all of the alternative state variable values and the affected contexts are identical to all of the modified state variable values and the affected contexts, the possible alternative syntax value is called an "acceptable alternative value." In other words, the change would be acceptable if the state variables and the affected contexts have the same values that they would have had if the change had not been made.

Figure 3:
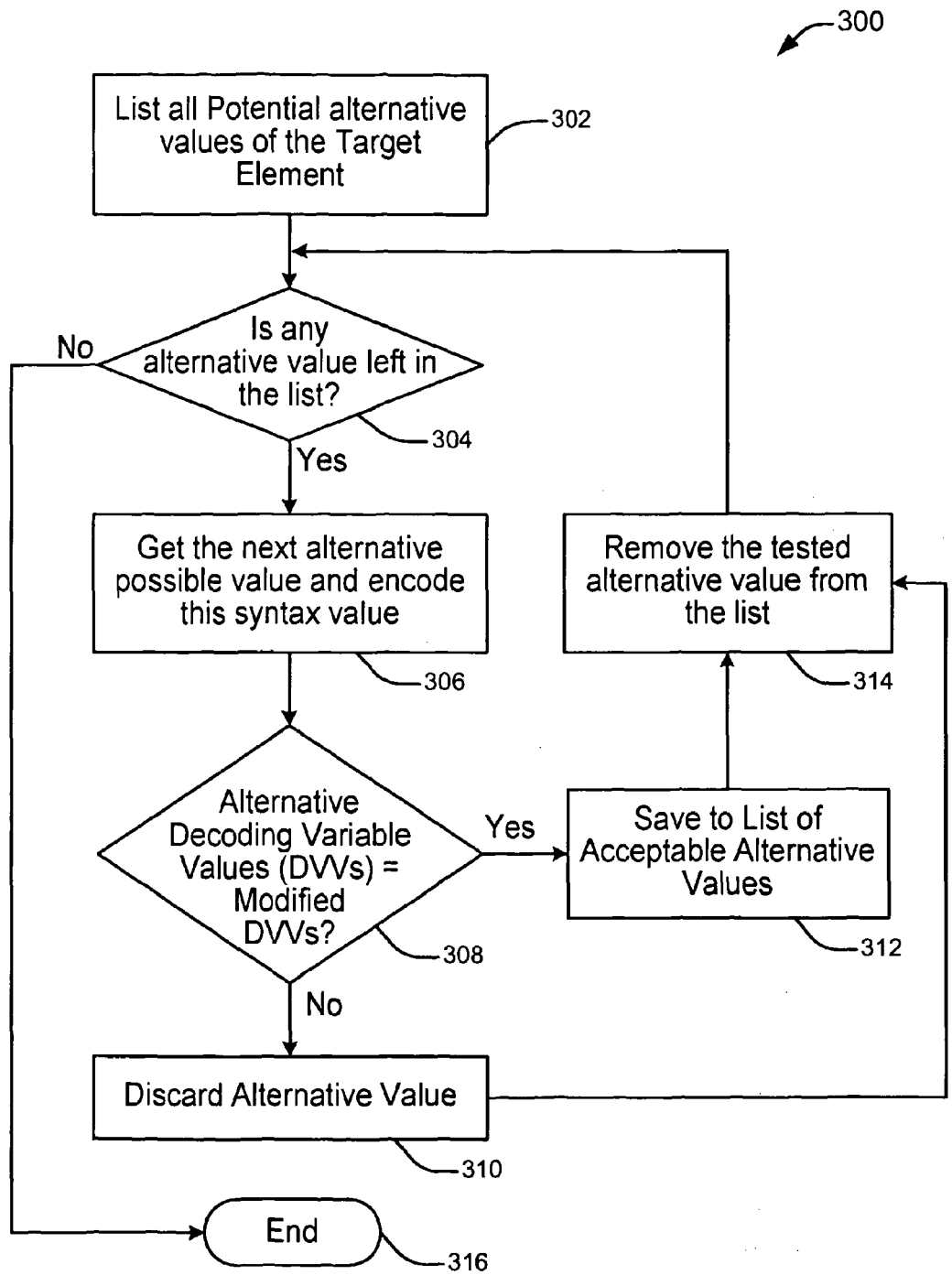
FIG. 3 is a flow diagram of a method for modifying a target syntax element.

Two different orderings of these two steps 202, 204 are depicted in FIGS. 2a and 2b, and the details of Step 204 are illustrated in FIG. 3. Note that the mapping and assignment in Step 1 (202) is only required for target elements for which at least one alternative syntax value was found in Step 2 (204). In the second ordering of steps in FIG. 2b, the mapping of Step 1 (202) need only be performed for those identified target elements.

Figure 2C:
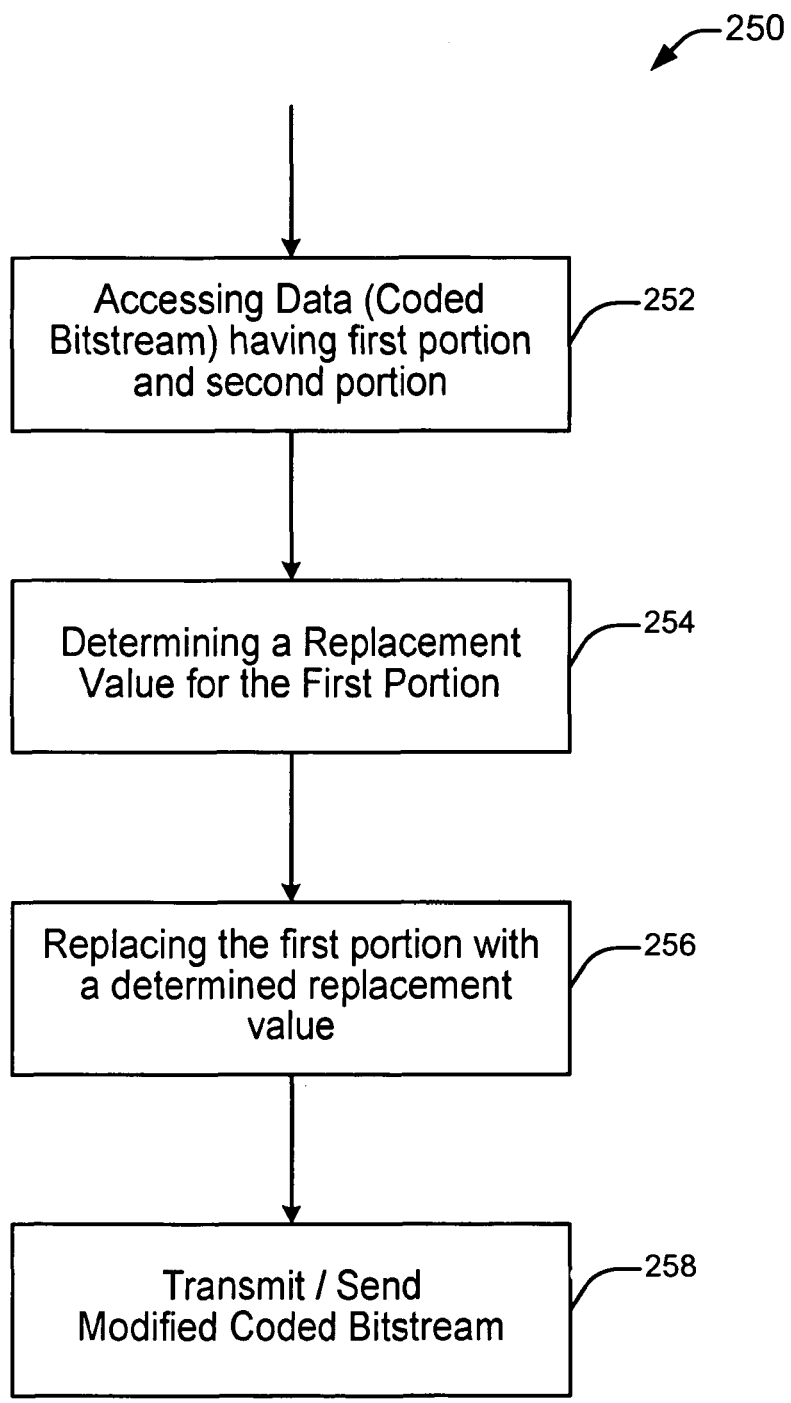
FIG. 2c is a block diagram of a method for modifying an encoded bitstream.

FIG. 2c shows a block diagram of a method 250 for modifying the coded bitstream. Initially the coded bitstream having a first portion and second portion is accessed (252). The replacement value is determined for the first portion (254) and the first portion is then replaced with the determined replacement value (256). Once the replacement value has replaced the first portion, the modified coded bitstream is sent (258). The "sending" may be, for example, electronic transmission or sending in a disc or master form.

The second portion referred to herein can be the next adjacent syntax element (and corresponding state variable value), or can be the remaining portion of the bitstream which could be made up of two or more syntax elements and corresponding state variable values. Thus, when determining the replacement value for the first portion, consideration can be made for all subsequent syntax elements and their respective state variable values. When the alternative or determined replacement value for the first portion does not change or alter the state variable value for the other syntax elements in the second portion, then the first replacement value will provide the desired resulting decoding of the second portion.

Operation 254, which determines a replacement value, can also be characterized as determining a modified first portion. In the implementation being discussed, prior to modification of the first portion, the second portion is originally decodable (the decoding depends in part on the unmodified first portion) to produce a particular result. Further, after the modification of the first portion, the second portion is decodable (the decoding depends in part on the modified first portion) to produce the same particular result.

Another implementation, similar to the method 250, involves two operations. The first operation is accessing encoded data including at least a first portion and a second portion. The second portion is decodable to produce a result that is based on the first portion as well as the second portion. The second operation is determining a modified first portion such that the second portion is decodable to produce the result based on the second portion and the modified first portion.

All or part of the data identifying locations of coded elements and possible replacement values can be stored on a storage device, or sent electronically. One implementation is an apparatus such as a DVD, a hard disk, or other storage device. The apparatus includes a processor-readable medium having information stored thereon. The stored information identifies a replacement value for a first portion of an encoded set of data. The encoded set of data also includes a second portion, and decoding of the second portion is based on the second portion and on the first portion. The replacement value has a property such that (1) decoding of the second portion produces a particular decoded result if decoding is performed on the encoded set of data including the first portion, and (2) decoding of the second portion produces the particular decoded result if decoding is performed on the encoded set of data including the replacement value instead of the first portion. Another implementation provides a signal formatted to include the information that is stored on processor-readable medium of this apparatus.

Figure 2D:
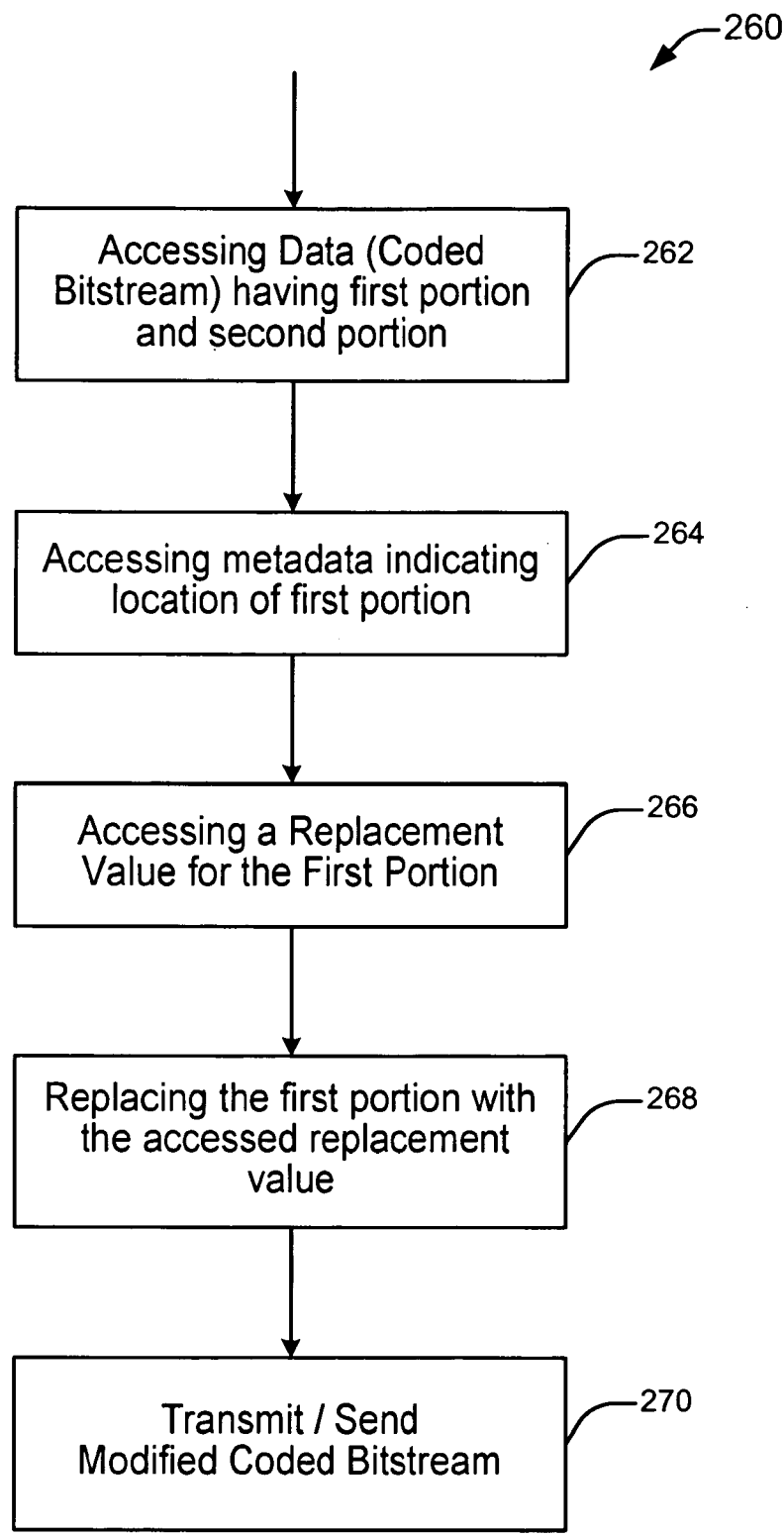
FIG. 2d is a block diagram of another method for modifying an encoded bitstream.

FIG. 2*d* shows a block diagram of another implementation of a method 260 for modifying the coded bitstream. Initially, the coded bitstream having a first portion and a second portion is accessed (262). Metadata is then accessed (264) providing information as to the location of the first portion within the coded bitstream. A replacement value for the first portion is then accessed (266) and the first portion is replaced (268) with the accessed replacement value. Once the replacement value has replaced the first portion, the modified coded bitstream is sent (270). The "sending" may be, for example, electronic transmission or sending in a disc or master form.

Another implementation, similar to the method 260, involves two operations. The first operation is accessing a coded bitstream that includes at least two portions. The second portion is decodable to produce a result that is based on the first portion as well as the second portion. The second operation is replacing the first portion with a replacement value to produce a modified coded bitstream for which a decoding of the second portion will still produce the result.

Additional implementations are directed to the result of methods such as the method 260. For example, one implementation is an apparatus such as a DVD, a hard disk, or other storage device that includes modified encoded data, and another implementation is a signal formatted to include such modified encoded data. More specifically, one implementation is an apparatus that includes a processor-readable medium, the processor-readable medium having stored thereon encoded data including a modified first portion and a second portion. The modified first portion is a replacement of a first portion, wherein (1) the second portion is decodable to produce a result that is based on the modified first portion as well as the second portion, and (2) the result is the same as if decoding of the second portion were performed based on the second portion and the first portion rather than the second portion and the modified first portion. Another implementation is a signal formatted to include the encoded data that is stored on the processor-readable medium of this apparatus.

FIG. 3 shows a flow diagram 300 representing one implementation for the step of finding all acceptable alternative values of the target element. Initially, a list of all potential alternative (replacement) values of the target element is provided (302). A determination is made 304 as to the whether there are any alternative (replacement) values left in the list. If not, the process ends 316. When there is an alternative (replacement) value in the list, the next alternative (replacement) possible value is obtained and the syntax value is encoded (306). A determination is then made as to whether the alternative (replacement) decoding variable values, including state variable values and contexts, are equal to the modified decoding variable values (308). When they are, the alternative (replacement) value is saved to the list of acceptable alternative values (312) and the tested value is then removed from the list (314). The process then starts again at step 304 until the list of potential alternative (replacement) values is exhausted.

We now consider the second Requirement R2. For a given target element, we need to assess or predict the perceptual impact of replacing its original value with each of the alternative values that satisfy Requirement R1. Recall that this assessment or prediction has full access to all of the syntax elements of the compressed stream and can use these to predict the masking effect of the underlying imagery and the sensitivity of the human visual or auditory system (in the case of video, we are concerned with the human visual system) to the modifications. Details of such a prediction are well known to those versed in the art of perceptual modeling. Perceptual models are widely cited in both the compression literature and the watermarking literature.

In addition to the use of compressed domain computational predictions of perceptibility, we may have the luxury of being able to fully decompress the stream to a motion image sequence. This may be the case, for example, if the analysis is being performed as a pre-process. In this case, the computational predictions can examine the actual pixel data. This may lead to more accurate predictions of perceptibility. Additionally, we may be able to assess the perceptibility of replacing an original syntax element value with an alternative value by decompressing the original stream to obtain a reference motion image sequence and then replacing the syntax element value with the alternative and decompressing the resulting stream to obtain a second motion image sequence. Many well known techniques can be used for assessing the perceptibility of the difference between the two motion image sequences.

Finally, we may have the luxury to resort to subjective assessment. A human viewer can assess the perceptibility of the difference between the reference motion image sequence and the modified motion image sequence. If the subject cannot perceive the difference, then the modification satisfies Requirement R2.

These are but some of the methods that can be used to determine which, of all the changes satisfying Requirement R1, also satisfy Requirement R2.

We now consider the third Requirement R3. Use of the alternative syntax value for the target syntax element must induce some measurable change when the modified stream is later decompressed to a motion image sequence. There are two kinds of measurable changes that can be induced, "direct" and "indirect".

With "direct changes" the syntax element corresponds directly to a measurable artifact of the motion image sequence. For example, modification of a luminance block DC coefficient will directly result in a measurable change in mean luminance of the corresponding decompressed block. With "indirect changes" on the other hand the artifact measured in the image sequence is only indirectly related to the modification in the stream. For example, modification of a motion vector will result in the wrong block being used as a prediction and will therefore lead to incorrect pixel data in the corresponding decompressed block. It may be difficult to determine which motion vector was used, but the use of a different motion vector can impact other measurable artifacts. The motion vector can be used to yield a reconstructed block with higher or lower mean luminance.

The measurable change of requirement R3 will assist in identifying the locations and in seeing what changes were made in order to recover the payload. This is particularly useful when a pirated copy is obtained. By "seeing" the changes that were made, the source of the pirated copy can be obtained.

In one implementation, it is determined which motion vector syntax elements have at least two alternative syntax values satisfying Requirements R1 and R2, such that use of one of the alternative syntax values will yield a reconstructed block with higher mean luminance and use of a different alternative syntax value will yield a reconstructed block with lower mean luminance. The coded blocks of bits corresponding to the CABAC coding of each of these two alternative values, along with the bit location within the CABAC stream, are sent, as metadata, to the embedder. Based on the value of the corresponding payload bit, the embedder will replace the original block of bits with the block of bits corresponding to one or the other alternative block of bits. For example, the embedder chooses or selects the block of bits associated with the syntax value that decreases the mean luminance in the corresponding block if the payload bit is a '0' and choose the block of bits associated with the syntax value that increases the mean luminance in the corresponding block if the payload bit is a '1'. Clearly, we need at least one target element satisfying all of Requirements R1, R2, and R3 for each payload bit to be embedded.

The metadata should also contain the frame number and block number in the decompressed motion image sequence where the change in luminance will be induced. For further robustness, the preprocessing stage may also store the original mean luminance of that block in the metadata. This information is used at the time of recovery (for example, decoding) to identify the modified block and compare its mean luminance with the original value stored in the metadata. In the example give, a mean luminance that is higher than the original value will imply that the corresponding payload bit is a '1' and a mean luminance that is lower than the original value will imply that the corresponding payload bit is a '0'.

Bit-Length Constraint

When there is an added constraint that the alternative Coded Block of bits have the same length as the original Coded Block of bits, we can simply add that constraint to Requirement R1. In other words, the change would be acceptable if all of the state variables and the affected contexts remain the same as they would have been and if the resulting coded block is the same length as the original. For example, referring again to FIG. 3, decision block 308 could be modified to determine not only whether the decoding variable values remain the same, but also to determine whether the resulting coded block has the same length as the original. As another example, referring again to FIG. 3, block 302 could be modified to provide a list of all potential alternative values of the Target Element that result in a coded block of bits having the same length as the original.

Figure 5:
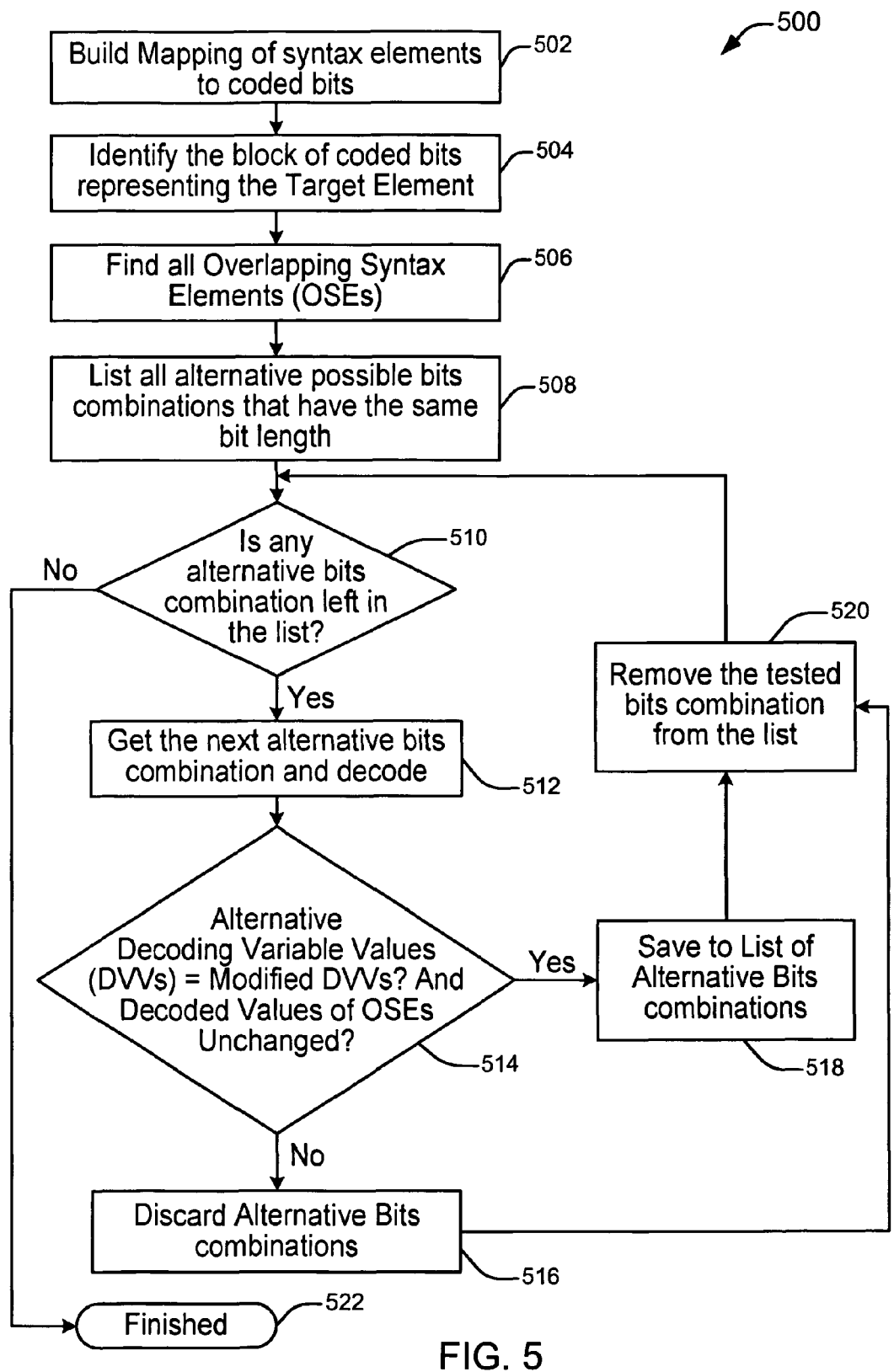
FIG. 5 is a flow diagram of another method for modifying a target syntax element.

The previously described approach for adding the bit-length constraint is one possible approach. However, in some applications an alternative approach may be suitable. We now present a different approach intended to limit the search for acceptable alternative values. In this implementation, described in FIG. 5, the first step is to build a mapping from all syntax elements to their corresponding coded bits in the bitstream (502). In the second step, one target element from the list is identified and the coded block of bits in the bitstream representing that element is identified (504).

Since CABAC can assign fractions of bits to represent syntax elements, there is the possibility that the blocks of bits representing different syntax elements can overlap. The third step is the identification of any other syntax elements whose representation in the coded bitstream overlaps with that of the element to be modified (506). These are referred to herein as Overlapping Syntax Elements. The list for all alternative possible bit combinations that have the same bit length is determined (508), and the subsequent remaining steps for determining which of the identified alternative possible bit combinations that have the same bit length will be used (that is, steps 510-522) are substantially identical to the steps 304-316, respectively, described for determining which of the potential alternative values of the target element will be used. One difference is that block 514 includes determining whether the alternative bit combination satisfies the condition that the decoded values of any Overlapping Syntax Elements remain unchanged, as well as determining whether the decoding variable values remain unchanged.

If the block of coded bits has length n, there will be different possible values that it can represent. We search for any such value that meets the following two criteria:

1. The decoded values of the Overlapping Syntax Elements remain unchanged; and
2. All of the state variables and context variables changed by the block of coded bits are left with the same values as they were with the unmodified block of coded bits.

Here we have limited the search to only those alternative values that result in an alternative coded block of bits the same size as the original coded block of bits.

Implementations need not address both overlapping syntax elements and bit-length constraints. Rather, certain implementations may address only overlapping syntax elements, or only a bit-length constraint, without addressing the other consideration.

Further, various implementations may work on multiple syntax elements together (for example, syntax elements that are contiguous in the data stream). For example, an implementation treats multiple contiguous syntax elements (overlapping or non-overlapping) as a single group and determines a replacement for the group, such that the decoding variable values at the end of the group (but not necessarily between syntax elements within the group) remain unchanged. One such implementation considers two contiguous syntax elements as a target element, with the second syntax element being an overlapping syntax element, and allows both syntax elements to be modified.

Information Embedding

The above discussion describes a method for analyzing a target syntax element and identifying all, if any, acceptable alternative values that could be substituted by replacing a block of bits in the coded bitstream with an alternative block of bits. By examining all syntax elements in an H.264/AVC coded sequence, we can build a list of those for which there exists at least one acceptable alternative value. This is the list of "changeable syntax elements". For each syntax element that can be changed, we can build a list of the acceptable alternative values.

An example of how this can be used for embedding information in the bitstream has been presented. The goal of information embedding is to modify a subset of the syntax elements on the list of all changeable syntax elements, changing their values from their original values to one of the listed acceptable alternative values, in accordance with the payload. In one practical implementation, this is accomplished in three steps as shown in FIG. 6.

Figure 6:
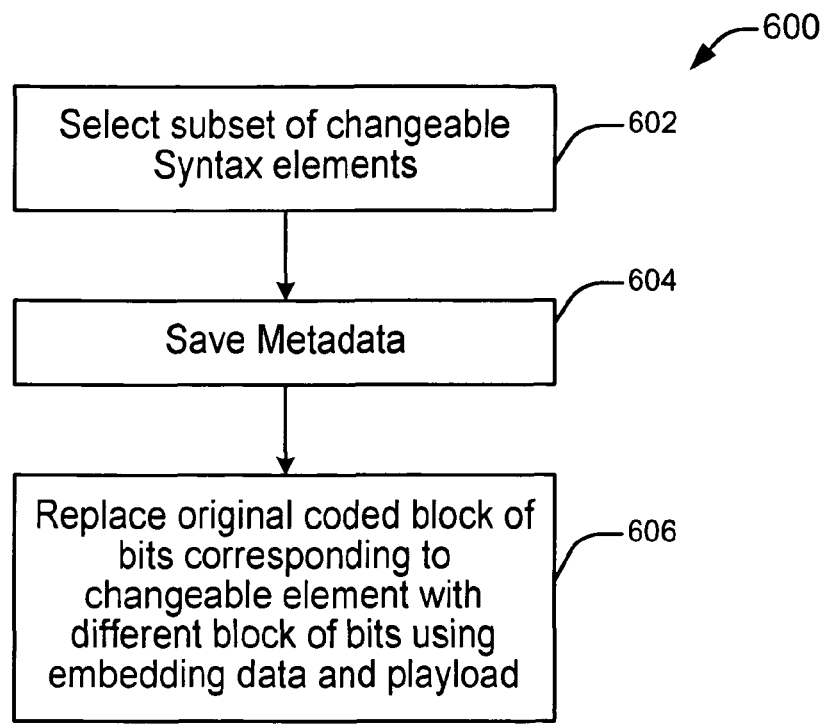
FIG. 6 is a flow diagram of a method for replacing a coded block of bits.

Referring to FIG. 6, there is a process 600. In the first step of the process 600, a subset of the changeable syntax elements is selected (602). This subset selection can be based on an estimate of the perceptual impact that the change would have on the decoded imagery. The subset selection can be based on an estimate of the difficulty of detecting the change in the decoded imagery after the imagery has been modified by signal processing or by intentional tampering. The subset selection can be influenced by implementation requirements that, for example, limit the number of consecutive bits in a changed block or limit the minimum number of unchanged bits that must be between any two changed blocks. In the preferred implementation, this first step is performed during preprocessing.

In the second step, the metadata is saved (604) for later use. This metadata consists of "embedding data" and "detection data". Embedding data are the locations in the compressed bitstream where the original coded block of bits can be found and two blocks of bits, one to be used as a replacement block if the corresponding payload bit is a '0' and the other to be used as a replacement block if the corresponding payload bit is a '1'. In one implementation, one of these blocks is itself the original block of bits and the other is an alternative block of bits. In this case, the list of changeable syntax elements can include those for which there is only one acceptable alternative value. In another implementation, the two blocks are both alternative blocks of bits corresponding to different syntax values. In this case, the list of changeable syntax elements can only include those for which there are at least two acceptable alternatives.

Detection data includes the set of changeable elements that will be used for embedding and the original values of those elements. It also includes the location in the decompressed motion image sequence where the bitstream modification will be detectable. This may be specified as a frame number and a block number or macroblock number or pixel position or any other locator required for recovery. Detection data can also include the value of the detection measure that would have been measured if no change had been made. In other words, this can include the original value of the detection measure. In the previous example, the detection measure is the mean luminance of a particular block and the detection data can include the original mean luminance of that block. In one implementation, this second step is performed during preprocessing.

In order to increase the robustness of the watermarking technique to global or local changes in brightness or contrast, detection data may also be saved for blocks that are not expected to be modified by the watermarking process. For example, the detection data may include the original mean luminance of blocks not changed by the watermark. The detector can then use these as a reference to determine if the entire image, or at least the part of the image in the region of the reference, has experienced a change in luminance. If the measured luminance in the reference blocks does not match that recorded in the detection data, a compensation can be made prior to recovery of the payload.

In the third step, the original coded block of bits corresponding to the changeable element is replaced with a different block of bits using the embedding data and the payload (606). We consider two cases. In the first case, the replacement block of bits is the block of coded bits corresponding to one of the acceptable alternative values if the payload bit to be represented has one symbol value, for example a '1'. The replacement block of coded bits is the original block of coded bits if the payload bit to be represented has the other symbol value, for example a '0'. In the second case, the subset selection is restricted to elements for which there are at least two acceptable alternative values. In this case, the replacement block of coded bits is the block of coded bits corresponding to one of the acceptable alternative values if the bit to be represented is a '0' and it is the block of coded bits corresponding to a different acceptable alternative value if the bit to be represented is a '1'. The two alternative values are stored in the detection data along with the labels, '0' or '1', that they represent. In the preferred embodiment, this third step is performed during embedding.

The payload can be recovered from the H.264/AVC bitstream with the aid of the detection data. The detection data indicates the specific syntax elements that represent the hidden payload information and the original values of those elements. If the embedding process used the original values to represent a '0' and the alternative value to represent a '1', the detector can compare the value in the bitstream with the original value stored in the detection data. If they match, the detector reports a '0' bit. If they do not match, the detector reports a '1' bit. If the embedding process replaced the original value with one of two alternative values, those two alternative values and their corresponding labels are recovered from the detection data. The detector then compares the value in the bitstream with each of the two alternatives and reports the corresponding label.

The hidden data can also be recovered from the decoded pixel-domain imagery. This process is specific to the particular measure used in the subset selection process. In one practical implementation, the measure is the mean luminance of a block of pixels. The original mean luminance of each modified block is recovered from the detection data. The detector calculates the mean luminance of the specified block of pixels in the decoded image sequence and compares that value to the original value stored in the detection data. If the calculated value is higher than the original value, the detector reports a '1' bit. If the calculated value is lower than the original, the detector reports a '0' bit.

This recovery method could have problems if the decoded imagery is modified by uniform change in luminance after decoding, but prior to detection. In order to address this, the mean luminance of a number of reference blocks can be stored in the detection data. These are blocks that are not changed by the embedding process. The detector can calculate the mean luminance of the reference blocks just prior to recovery and discover any luminance changes that are unrelated to the hidden data. These luminance changes can be compensated by adjusting the original values accordingly.

It should be clear that information embedding may include a variety of applications. One such application is watermarking in which a payload is embedded in a datastream. Other applications include embedding virtually any information that is desired to be communicated. Additionally, some information embedding applications may use different requirements. For example, it may be desirable to make a change to the datastream that results in a change that is perceivable by a user.

Exploitation of Bypass Mode

Figure 4:
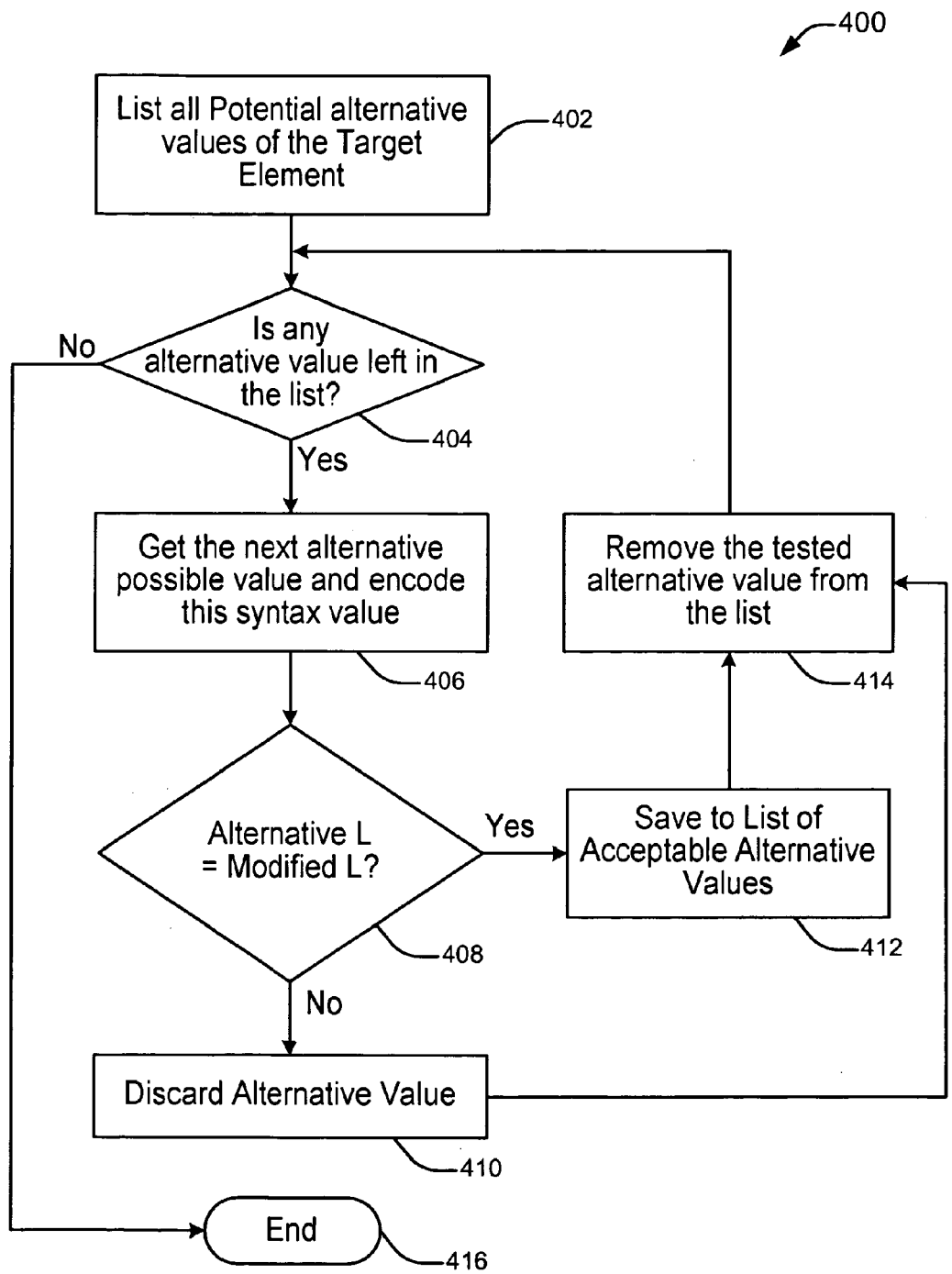
FIG. 4 is a flow diagram of a method for modifying a target syntax element that is encoded as bypass mode.

H.264/AVC specifies three syntax elements that are coded in bypass mode. For these, only one variable is modified during encoding. Only the L value, representing the bottom of the range, changes as bits are coded. Thus, the likelihood of finding alternative syntax values that yield the same decoding variable values as the original is higher with bypass mode syntax elements. In one practical implementation, only the suffix of motion vector difference syntax elements is considered. For each of these, we search for alternative values that 1) result in the same number of bits in the coded block of bits, 2) do not affect the values of any other syntax elements, and 3) yield the same L value in the CABAC encoder after its corresponding bin string is processed. From these, we select a subset to be used for embedding as described above (see, for example, FIG. 6). The steps for bypass-mode, fixed length substitution are shown by a method 400 depicted in FIG. 4. Here, the processes in steps 402-416 are identical to those previously described in steps 302-316, respectively shown in the method of FIG. 3, with the exception that step 408 is a determination that the alternative L is equal to the modified L for CABAC coding, as opposed to a determination of alternative decoding variable values vs. modified decoding variable values (that is, step 308).

As should be clear, an unmodified bitstream can be decoded to produce the original syntax values, including values for a target syntax element and one or more syntax elements that follow the target syntax element. As described earlier, the coding of the one or more syntax elements that follow the target syntax element depends, at least in part, on the value of the target syntax element. After the value of the target syntax element is modified, a resulting modified bitstream is produced that corresponds to the modified syntax value and the values of the one or more syntax elements that follow the now-modified target syntax element. This modified bitstream can also be decoded.

Figure 7:
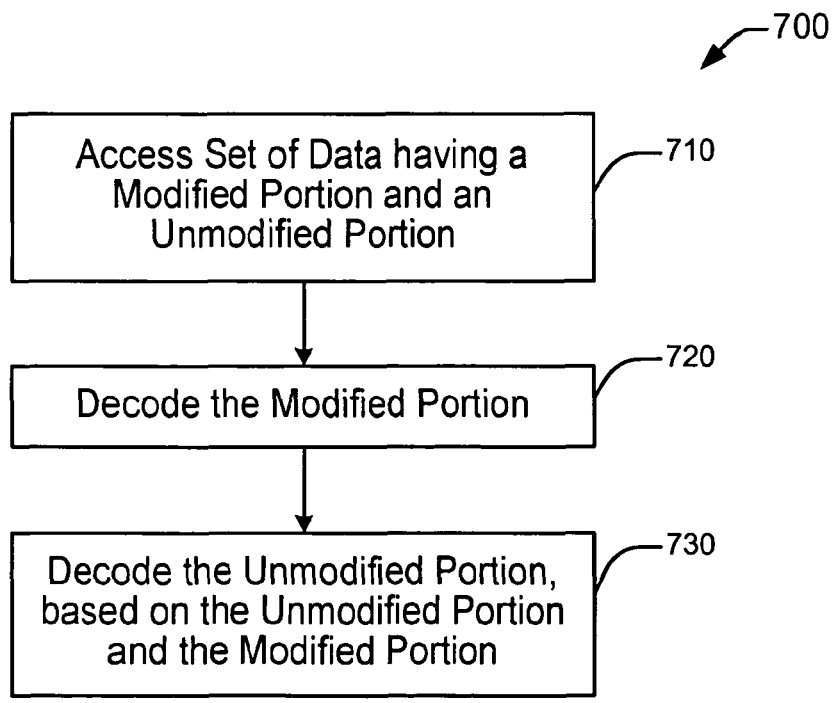
FIG. 7 is a flow diagram of a method for decoding a modified bitstream.

Referring to FIG. 7, there is shown a process 700 that may be performed by, for example, a decoder, a DVD player, or another device that accesses and decodes a modified bit stream. The decoding of the modified bitstream produces the modified value of the target syntax element, and also produces the original values of the one or more syntax elements that followed the target syntax element.

More specifically, with reference to the process 700, a modified set of data is accessed (710). The modified set of data includes a modified portion and another portion which is, in this implementation, unmodified. As indicated above, the unmodified portion is decodable to produce a result that is based on the unmodified portion as well as the modified portion.

The process 700 includes decoding the modified portion (720) and the unmodified portion (730). Decoding the unmodified portion produces the same result as if the modified portion had not been modified.

Figure 8:
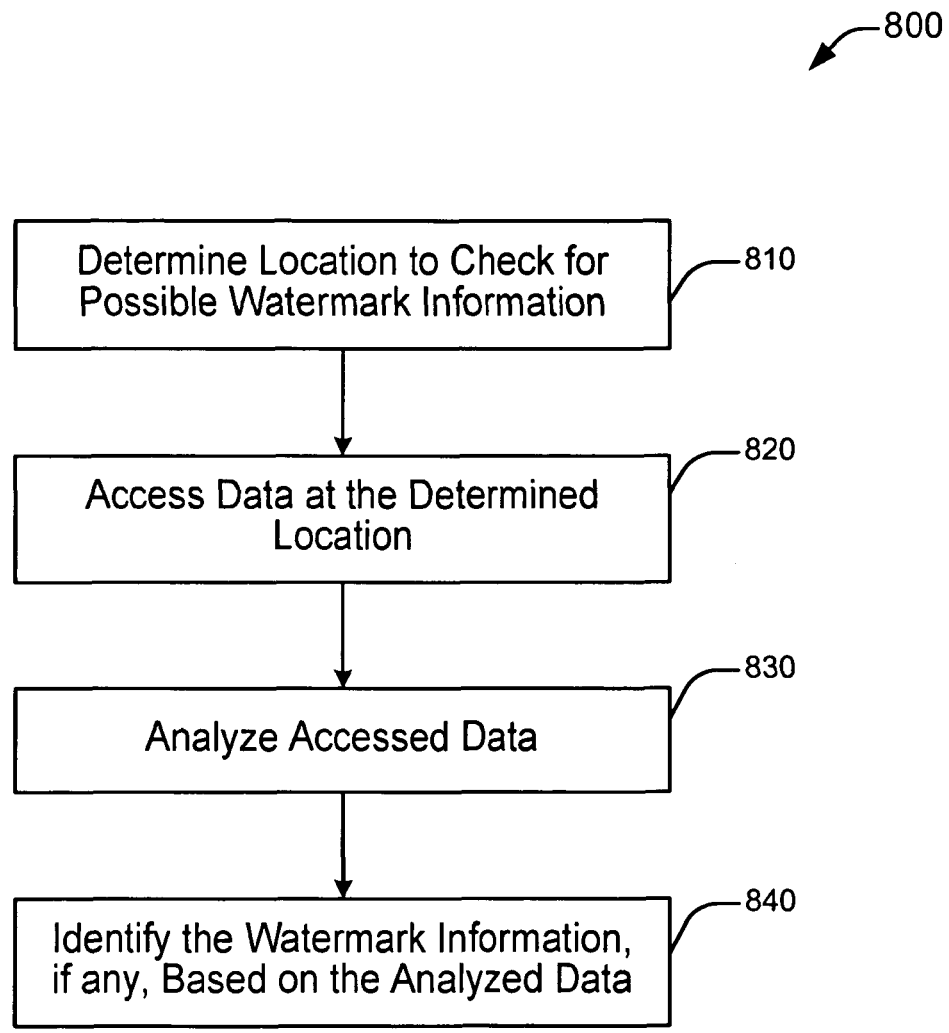
FIG. 8 is a flow diagram of a method for detecting watermark information.

Referring to FIG. 8, a process 800 is shown for recovering payload information, or more generally, for detecting a watermark. The process 800 includes determining a location to check for a possible watermark (810). Note that a watermark, which refers generally to data modified or inserted to allow subsequent detection, need not necessarily have been inserted. The process 800 includes accessing (820) and analyzing (830) data from the determined location. The process 800 further includes identifying the watermark information, if any watermark exists, based on the analysis (840). The identified watermark information may be, for example, a bit or other unit of information. The process 800 may be repeated for one or more other locations to identify one or more additional bits that make up a payload. Thus, an entire payload may be recovered using the process 800.

Implementations of the process 800 include analyzing a modified bitstream as well as analyzing pixel-domain data. For example, a bitstream may be modified by modifying bits associated with a target element, according to one of the implementations previously described. A watermark may be detected in such a bitstream by accessing the appropriate bit locations and testing for the watermark (modification) at those locations. The bit locations and modified values (or possibly modified values), such as found in the metadata, may also be included in the detection data.

Alternatively, or in addition, such a modified bitstream may be decoded and possibly subject to other processing, including re-encoding. In the case of re-encoding, such a re-encoded bitstream will not be expected to include the same modified target element, at the same location, as in the original modified bitstream. However, the re-encoded bitstream may be decoded to produce a pixel-domain digital representation in which an effect of the original modification is still typically present. Thus, detection data will be useful that identifies the frame and block number in which the original modification had its impact. For example, the target element may have originally been a motion vector for a particular block, and the impact of modifying the motion vector may have been an increase in the mean luminance of that particular block. That increase in mean luminance will typically be preserved despite the processing of the original modified bitstream. However, the motion vector, and the original change to the motion vector will typically not be exactly the same.

Figure 9:
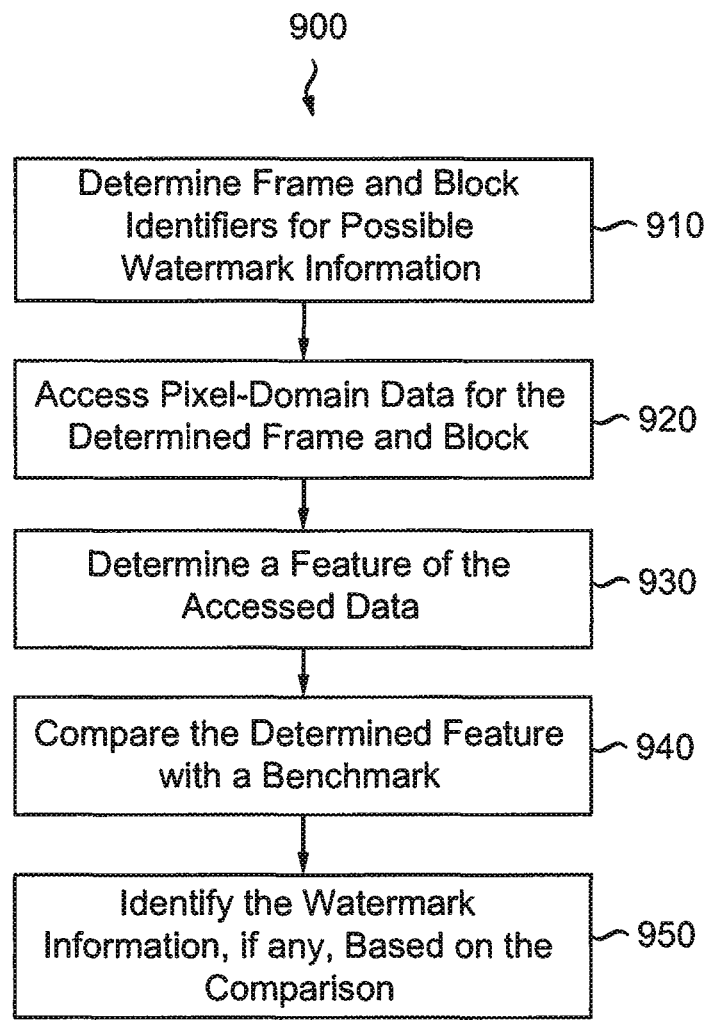
FIG. 9 is a flow diagram of another method for detecting watermark information.

Referring to FIG. 9, a process 900 describes an implementation in which watermark information is detected from pixel-domain data. The process 900 includes determining a frame identifier and a block identifier for a possible watermark (910), and accessing (920) pixel-domain data corresponding to the determined frame identifier and block identifier. The process 900 includes determining a value of a feature for the accessed data (930), and comparing the determined value with a benchmark (940). The process 900 then includes identifying the watermark information, if any, based on the comparison (950).

Various implementations of the process 800 or the process 900 use stored detection data that includes one or more of a variety of pieces of data. For example, the detection data may include location information identifying the locations to check for a possible watermark. The location information may include, for example, a frame identifier and/or a block identifier.

Detection data may include, for example, a benchmark value for a feature. The benchmark may be, for example, the value of the feature before the location was modified. The benchmark may be, for example, compared to the actual value (the new benchmark) of the feature for the accessed location (820) to provide an indication of the change. For example, the comparison may indicate whether the value (the new benchmark) has increased or decreased as a result of the modification.

Detection data may include, for example, a base value for a feature from a different (non-watermarked) location. Such a base value may be, for example, the mean luminance of a non-watermarked location. The base value may be used, as explained earlier, to determine if there was a change to the data that affected more than the watermarked location. In certain circumstances, there may have been a global change (for example, a change to an entire frame). For example, the mean luminance of an entire frame may have been changed. The base value can then be compared to the new value of the feature at the non-watermarked location (a new base value). If the difference is more than a threshold, then it may be determined that a global change occurred. Alternatively, the difference may simply be taken to be a global difference, and the difference may be added to the value (the new benchmark) determined for the (possible) watermarked location to account for the global change. Note that in this alternative, the difference may (alternatively) be added to the benchmark instead of the value (the new benchmark). Further, in certain implementations a ratio may be determined between the base value and the new base value, and either the benchmark or the new benchmark may be multiplied by the ratio.

Clearly the process 800 may be performed by a variety of devices, including processing devices. Such devices may also include a storage device for storing data, such as, for example, the accessed data, the benchmark value, the base value, and the location(s) of possible watermark information. Further, the process 800 may be embodied in a set of instructions as well.

As should be clear, a syntax element may represent one or more of various different types of information. For example, a syntax element may be a motion vector, a residue DCT (discrete cosine transform) coefficient, a macroblock type, a quantization parameter, or a flag. Accordingly, syntax elements need not all have the same length but can have various different lengths. Various implementations disclosed in this application may work on any type of syntax element, regardless of what type of information is represented by the syntax element and regardless of the size/length of the syntax element.

Additionally, as previously indicated, various implementations may work on multiple syntax elements together (for example, syntax elements that are contiguous in the data stream). For example, an implementation treats multiple contiguous syntax elements (overlapping or non-overlapping) as a single group and determines a replacement for the group, such that the decoding variable values at the end of the group (but not necessarily between syntax elements within the group) remain unchanged.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of equipment include video coders, video decoders, video codecs, web servers, set-top boxes, laptops, personal computers, cell phones, PDAs, and other communication devices. As should be clear, the equipment may be mobile and even installed in a mobile vehicle.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a computer readable medium having instructions for carrying out a process.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method, for use with a processor, the method comprising:

accessing information for use in determining payload information conveyed in a watermarked image, the accessed information having been produced prior to watermarking an image to produce the watermarked image, said payload information being associated with a watermark included in said watermarked image, said watermarked image and said image being arithmetically encoded by an arithmetic code, said watermark modifying at least one syntax element of said image and having watermarked said image by replacing arithmetically coded bits directly without prior arithmetic decoding and re-encoding of said image, and the accessed information including:

location information that identifies a location of a set of pixels in the watermarked image, wherein the set of pixels conveys the payload information in a pixel-domain representation of the set of pixels of the watermarked image, one or more values for a feature in the pixel-domain representation of the set of pixels, wherein the one or more values for the feature indicate whether first payload information or second payload information is conveyed in the pixel-domain representation by the set of pixels, and wherein the one or more values comprise: a first value for the feature in the pixel-domain representation of the set of pixels, wherein the first value for the feature indicates that the first payload information is conveyed in the pixel-domain representation by the set of pixels; and a second value for the feature in the pixel-domain representation of the set of pixels, wherein the second value for the feature indicates that the second payload information is conveyed in the pixel-domain representation by the set of pixels;

accessing the watermarked image said watermarked image having a test value for the feature based on said modified at least one syntax element; determining the a-test value for the feature of the set of pixels in the accessed watermarked image; comparing the test value with at least one of the first value and second values for the feature; and determining the payload information based on a result of the comparing of the test value.

2. The method of claim 1 wherein the feature comprises an average luminance of the set of pixels, or a variance of the set of pixels.

3. The method of claim 1 wherein the location of the set of pixels that conveys the payload information, as well as the set of pixels, have been selected based on content present at the location prior to watermarking an image to produce the watermarked image.

4. The method of claim 1 further comprising using the determined payload information to identify a device that applied the payload information and created the watermarked image.

5. The method of claim 1 wherein the location information comprises:
a frame identifier that identifies the watermarked image; and a block identifier that identifies the set of pixels.

6. The method of claim 1 wherein:
the accessed information further comprises a base value for the feature based on a second location that is different from the location of the set of pixels and that does not convey payload information; and
determining the test value for the feature comprises:
determining an actual value for the feature for pixels at the second location,
comparing the base value with the determined actual value for the feature for pixels at the second location,
determining an actual value for the feature of the set of pixels in the accessed watermarked image, and
adjusting the determined actual value for the feature of the set of pixels to produce the test value, the adjusting being based on a result of the comparing of the base value with the determined actual value for the feature for pixels at the second location.

7. The method of claim 6 wherein:
the result of the comparing of the base value comprises a difference between the base value and the determined actual value for the feature for pixels at the second location, and
adjusting the determined actual value for the feature of the set of pixels comprises adding or subtracting a number to the determined actual value for the feature of the set of pixels, the number being based on the difference.

8. The method of claim 6 wherein:
the result of the comparing of the base value comprises a ratio between the base value and the determined actual value for the feature for pixels at the second location, and
adjusting the determined actual value for the feature of the set of pixels comprises multiplying or dividing a number by the determined actual value for the feature of the set of pixels, the number being based on the ratio.

9. The method of claim 1 wherein determining the payload information comprises determining a value for a bit of a payload.

10. The method of claim 9 wherein the payload is a one-bit payload.

11. The method of claim 1 further comprising:
repeating the operations of accessing information, determining the test value, and comparing the test value, the repeating being done one or more times for additional locations in the watermarked image.

12. The method of claim 1 further comprising:
repeating the operations of accessing information, determining the test value, comparing the test value, and determining the payload information, the repeating being done one or more times for additional locations in the watermarked image.

13. The method of claim 1 further comprising:
repeating the operations of accessing information, accessing a watermarked image, determining the test value, comparing the test value, and determining the payload information, the repeating being done for one or more additional watermarked images.

14. An Apparatus comprising a processing device configured to perform at least the following:

accessing information for use in determining payload information conveyed in a watermarked image, the accessed information having been produced prior to watermarking an image to produce the watermarked image, said payload information being associated with a watermark included in said watermarked image, said watermarked image and said image being arithmetically encoded by an arithmetic code, said watermark modifying at least one syntax element of said image and having watermarked said image by replacing arithmetically coded bits directly without prior arithmetic decoding and re-encoding of said image, and the accessed information including:

location information that identifies a location of a set of pixels in the watermarked image, wherein the set of pixels conveys the payload information in a pixel-domain representation of the set of pixels of the watermarked image, one or more values for a feature in the pixel-domain representation of the set of pixels, wherein the one or more values for the feature indicate whether first payload information or second payload information is conveyed in the pixel-domain representation by the set of pixels, and wherein the one or more values comprise: a first value for the feature in the pixel-domain representation of the set of pixels, wherein the first value for the feature indicates that the first payload information is conveyed in the pixel-domain representation by the set of pixels; and a second value for the feature in the pixel-domain representation of the set of pixels, wherein the second value for the feature indicates that the second payload information is conveyed in the pixel-domain representation by the set of pixels;

accessing the watermarked image said watermarked image having a test value for the feature based on said modified at least one syntax element; determining the a-test value for the feature of the set of pixels in the accessed watermarked image; comparing the test value with at least one of the first value and second values for the feature; and determining the payload information based on a result of the comparing of the test value.

15. The Apparatus of claim 14 wherein the feature comprises an average luminance of the set of pixels, or a variance of the set of pixels.

16. The Apparatus of claim 14 wherein the location of the set of pixels that conveys the payload information, as well as the set of pixels, have been selected based on content present at the location prior to watermarking an image to produce the watermarked image.

17. The Apparatus of claim 14 wherein the processing device is further configured to perform at least the following: using the determined payload information to identify a device that applied the payload information and created the watermarked image.

18. The Apparatus of claim 14 wherein the location information comprises:
a frame identifier that identifies the watermarked image; and a block identifier that identifies the set of pixels.

19. The Apparatus of claim 14 wherein:
the accessed information further comprises a base value for the feature based on a second location that is different from the location of the set of pixels and that does not convey payload information; and
determining the test value for the feature comprises:
determining an actual value for the feature for pixels at the second location,
comparing the base value with the determined actual value for the feature for pixels at the second location,
determining an actual value for the feature of the set of pixels in the accessed watermarked image, and
adjusting the determined actual value for the feature of the set of pixels to produce the test value, the adjusting being based on a result of the comparing of the base value with the determined actual value for the feature for pixels at the second location.

20. The Apparatus of claim 14 wherein determining the payload information comprises determining a value for a bit of a payload.

21. The Apparatus of claim 14 wherein the processing device is further configured to perform the following repeating operations:
repeating the operations of accessing information, determining the test value, and comparing the test value, the repeating being done one or more times for additional locations in the watermarked image.

22. The Apparatus of claim 14 further comprising a memory for storing the accessed information.

23. An Apparatus comprising: means for performing at least the following:
accessing information for use in determining payload information conveyed in a watermarked image, the accessed information having been produced prior to watermarking an image to produce the watermarked image, said payload information being associated with a watermark included in said watermarked image, said watermarked image and said image being arithmetically encoded by an arithmetic code, said watermark modifying at least one syntax element of said image and having watermarked said image by replacing arithmetically coded bits directly without prior arithmetic decoding and re-encoding of said image, and the accessed information including:
location information that identifies a location of a set of pixels in the watermarked image, wherein the set of pixels conveys the payload information in a pixel-domain representation of the set of pixels of the watermarked image,
one or more values for a feature in the pixel-domain representation of the set of pixels, wherein the one or more values for the feature indicate whether first payload information or second payload information is conveyed in the pixel-domain representation by the set of pixels, and wherein the one or more values comprise: a first value for the feature in the pixel-domain representation of the set of pixels, wherein the first value for the feature indicates that the first payload information is conveyed in the pixel-domain representation by the set of pixels; and a second value for the feature in the pixel-domain representation of the set of pixels, wherein the second value for the feature indicates that the second payload information is conveyed in the pixel-domain representation by the set of pixels;
accessing the watermarked image said watermarked image having a test value for the feature based on said modified at least one syntax element; determining the a-test value for the feature of the set of pixels in the accessed watermarked image; comparing the test value with at least one of the first value and second value for the feature; and determining the payload information based on a result of the comparing of the test value; and a processor readable medium for storing the accessed information.

24. The Apparatus of claim 23 wherein the feature comprises an average luminance of the set of pixels, or a variance of the set of pixels.

25. The Apparatus of claim 23 wherein the location of the set of pixels that conveys the payload information, as well as the set of pixels, have been selected based on content present at the location prior to watermarking an image to produce the watermarked image.

26. The Apparatus of claim 23 wherein the processing device is further configured to perform at least the following:
using the determined payload information to identify a device that applied the payload information and created the watermarked image.

27. The Apparatus of claim 23 wherein the location information comprises:
a frame identifier that identifies the watermarked image; and a block identifier that identifies the set of pixels.

28. The Apparatus of claim 23 wherein:
the accessed information further comprises a base value for the feature based on a second location that is different from the location of the set of pixels and that does not convey payload information; and
determining the test value for the feature comprises:
determining an actual value for the feature for pixels at the second location,
comparing the base value with the determined actual value for the feature for pixels at the second location,
determining an actual value for the feature of the set of pixels in the accessed watermarked image, and adjusting the determined actual value for the feature of the set of pixels to produce the test value, the adjusting being based on a result of the comparing of the base value with the determined actual value for the feature for pixels at the second location.

29. The Apparatus of claim 23 wherein determining the payload information comprises determining a value for a bit of a payload.

30. The Apparatus of claim 23 wherein the processing device is further configured to perform:
repeating the operations of accessing information, determining the test value, and comparing the test value, the repeating being done one or more times for additional locations in the watermarked image.

31. An Apparatus comprising a non-transitory processor-readable medium including instructions stored on the processor-readable medium for performing at least the following:
accessing information for use in determining payload information conveyed in a watermarked image, the accessed information having been produced prior to watermarking an image to produce the watermarked image, said payload information being associated with a watermark included in said watermarked image, said watermarked image and said image being arithmetically encoded by an arithmetic code, said watermark modifying at least one syntax element of said image and having watermarked said image by replacing arithmetically coded bits directly without prior arithmetic decoding and re-encoding of said image, and the accessed information including:
location information that identifies a location of a set of pixels in the watermarked image, wherein the set of pixels conveys the payload information in a pixel-domain representation of the set of pixels of the watermarked image,
one or more values for a feature in the pixel-domain representation of the set of pixels, wherein the one or more values for the feature indicate whether first payload information or second payload information is conveyed in the pixel-domain representation by the set of pixels, and wherein the one or more values comprise: a first value for the feature in the pixel-domain representation of the set of pixels, wherein the first value for the feature indicates that the first payload information is conveyed in the pixel-domain representation by the set of pixels; and a second value for the feature in the pixel-domain representation of the set of pixels, wherein the second value for the feature indicates that the second payload information is conveyed in the pixel-domain representation by the set of pixels;
accessing the watermarked image said watermarked image having a test value for the feature based on said modified at least one syntax element; determining the a-test value for the feature of the set of pixels in the accessed watermarked image; comparing the test value with at least one of the first value and second values for the feature; and determining the payload information based on a result of the comparing of the test value.

32. The Apparatus of claim 31 wherein the feature comprises an average luminance of the set of pixels, or a variance of the set of pixels.

33. The Apparatus of claim 31 wherein the location of the set of pixels that conveys the payload information, as well as the set of pixels, have been selected based on content present at the location prior to watermarking an image to produce the watermarked image.

34. The Apparatus of claim 31 wherein the non-transitory processor-readable medium further includes instructions stored on the processor-readable medium for performing at least the following:
using the determined payload information to identify a device that applied the payload information and created the watermarked image.

35. The Apparatus of claim 31 wherein the location information comprises:
a frame identifier that identifies the watermarked image; and a block identifier that identifies the set of pixels.

36. The Apparatus of claim 31 wherein:
the accessed information further comprises a base value for the feature based on a second location that is different from the location of the set of pixels and that does not convey payload information; and
determining the test value for the feature comprises:
determining an actual value for the feature for pixels at the second location,
comparing the base value with the determined actual value for the feature for pixels at the second location,
determining an actual value for the feature of the set of pixels in the accessed watermarked image, and
adjusting the determined actual value for the feature of the set of pixels to produce the test value, the adjusting being based on a result of the comparing of the base value with the determined actual value for the feature for pixels at the second location.

37. The Apparatus of claim 31 wherein determining the payload information comprises determining a value for a bit of a payload.

38. The Apparatus of claim 31 wherein the non-transitory processor-readable medium further includes instructions stored on the processor-readable medium for performing:
repeating the operations of accessing information, determining the test value, and comparing the test value, the repeating being done one or more times for additional locations in the watermarked image.

39. The method of claim 1 further comprising:
storing the accessed information.

40. The apparatus of claim 19 wherein:
the result of the comparing of the base value comprises a difference between the base value and the determined actual value for the feature for pixels at the second location, and
adjusting the determined actual value for the feature of the set of pixels comprises adding or subtracting a number to the determined actual value for the feature of the set of pixels, the number being based on the difference.

41. The apparatus of claim 19 wherein:
the result of the comparing of the base value comprises a ratio between the base value and the determined actual value for the feature for pixels at the second location, and
adjusting the determined actual value for the feature of the set of pixels comprises multiplying or dividing a number by the determined actual value for the feature of the set of pixels, the number being based on the ratio.

42. The apparatus of claim 14 wherein the payload is a one-bit payload.

43. The apparatus of claim 14 wherein the processing device is further configured to perform:
repeating the operations of accessing information, determining the test value, comparing the test value, and determining the payload information, the repeating being done one or more times for additional locations in the watermarked image.

44. The apparatus of claim 14 wherein the processing device is further configured to perform:
repeating the operations of accessing information, accessing a watermarked image, determining the test value, comparing the test value, and determining the payload information, the repeating being done for one or more additional watermarked images.

45. The apparatus of claim 28 wherein:
the result of the comparing of the base value comprises a difference between the base value and the determined actual value for the feature for pixels at the second location, and
adjusting the determined actual value for the feature of the set of pixels comprises adding or subtracting a number to the determined actual value for the feature of the set of pixels, the number being based on the difference.

46. The apparatus of claim 28 wherein:
the result of the comparing of the base value comprises a ratio between the base value and the determined actual value for the feature for pixels at the second location, and
adjusting the determined actual value for the feature of the set of pixels comprises multiplying or dividing a number by the determined actual value for the feature of the set of pixels, the number being based on the ratio.

47. The apparatus of claim 23 wherein the payload is a one-bit payload.

48. The apparatus of claim 23 wherein the processing device is further configured to perform:
repeating the operations of accessing information, determining the test value, comparing the test value, and determining the payload information, the repeating being done one or more times for additional locations in the watermarked image.

49. The apparatus of claim 23 wherein the processing device is further configured to perform:
repeating the operations of accessing information, accessing a watermarked image, determining the test value, comparing the test value, and determining the payload information, the repeating being done for one or more additional watermarked images.

50. The apparatus of claim 36 wherein:
the result of the comparing of the base value comprises a difference between the base value and the determined actual value for the feature for pixels at the second location, and
adjusting the determined actual value for the feature of the set of pixels comprises adding or subtracting a number to the determined actual value for the feature of the set of pixels, the number being based on the difference.

51. The apparatus of claim 36 wherein:
the result of the comparing of the base value comprises a ratio between the base value and the determined actual value for the feature for pixels at the second location, and
adjusting the determined actual value for the feature of the set of pixels comprises multiplying or dividing a number by the determined actual value for the feature of the set of pixels, the number being based on the ratio.

52. The apparatus of claim 31 wherein the payload is a one-bit payload.

53. The apparatus of claim 31 wherein the non-transitory processor-readable medium further includes instructions stored on the processor-readable medium for performing:
repeating the operations of accessing information, determining the test value, comparing the test value, and determining the payload information, the repeating being done one or more times for additional locations in the watermarked image.

54. The apparatus of claim 31 wherein the non-transitory processor-readable medium further includes instructions stored on the processor-readable medium for performing:
repeating the operations of accessing information, accessing a watermarked image, determining the test value, comparing the test value, and determining the payload information, the repeating being done for one or more additional watermarked images.

55. The apparatus of claim 31 wherein the non-transitory processor-readable medium further includes instructions stored on the processor-readable medium for performing:
storing the accessed information.

56. A method comprising:
watermarking an image with a watermark, said watermarked image and said image being arithmetically encoded by an arithmetic code, said watermark modifying at least one syntax element of said image and having watermarked said image by replacing arithmetically coded bits directly without prior arithmetic decoding and re-encoding of said image, said watermarked image having a value for a feature of said image based on said modified at least one syntax element.

57. An Apparatus comprising a processing device configured to perform at least the following:
watermark an image with a watermark, said watermarked image and said image being arithmetically encoded by an arithmetic code, said watermark modifying at least one syntax element of said image and having watermarked said image by replacing arithmetically coded bits directly without prior arithmetic decoding and re-encoding of said image, said watermarked image having a value for a feature of said image based on said modified at least one syntax element.

58. An Apparatus comprising a non-transitory processor-readable medium including instructions stored on the processor-readable medium for performing at least the following:
watermark an image with a watermark, said watermarked image and said image being arithmetically encoded by an arithmetic code, said watermark modifying at least one syntax element of said image and having watermarked said image by replacing arithmetically coded bits directly without prior arithmetic decoding and re-encoding of said image, said watermarked image having a value for a feature of said image based on said modified at least one syntax element.

* * * * *